United States Patent
Suino et al.

(10) Patent No.: US 7,912,324 B2
(45) Date of Patent: Mar. 22, 2011

(54) ORDERLY STRUCTURED DOCUMENT CODE TRANSFERRING METHOD USING CHARACTER AND NON-CHARACTER MASK BLOCKS

(75) Inventors: Tooru Suino, Kanagawa (JP); Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 930 days.

(21) Appl. No.: 11/414,763

(22) Filed: Apr. 28, 2006

(65) Prior Publication Data

US 2006/0245655 A1  Nov. 2, 2006

(30) Foreign Application Priority Data

Apr. 28, 2005 (JP) ................................. 2005-131203

(51) Int. Cl.
*G06K 9/54* (2006.01)
*G06K 9/34* (2006.01)

(52) U.S. Cl. ....................................... 382/302; 382/176

(58) Field of Classification Search .................. 382/238, 382/302

See application file for complete search history.

(56) References Cited

U.S. PATENT DOCUMENTS

| | | |
|---|---|---|
| 4,115,693 A | 9/1978 | McGrath |
| 4,860,214 A | 8/1989 | Matsuda et al. |
| 4,882,754 A | 11/1989 | Weaver et al. |
| 5,025,481 A | 6/1991 | Ohuchi |
| 5,134,666 A | 7/1992 | Imao et al. |
| 5,148,495 A | 9/1992 | Imao et al. |
| 5,166,810 A | 11/1992 | Sorimachi et al. |
| 5,214,741 A | 5/1993 | Akamine et al. |
| 5,218,672 A | 6/1993 | Morgan et al. |
| 5,224,062 A | 6/1993 | McMillan, Jr. et al. |
| 5,311,332 A | 5/1994 | Imao et al. |
| 5,337,362 A | 8/1994 | Gormish et al. |
| 5,416,604 A | 5/1995 | Park |
| 5,418,899 A | 5/1995 | Aoki et al. |
| 5,430,480 A | 7/1995 | Allen et al. |
| 5,436,739 A | 7/1995 | Imao et al. |
| 5,475,388 A | 12/1995 | Gormish et al. |
| 5,541,742 A | 7/1996 | Imao et al. |
| 5,543,845 A | 8/1996 | Asamura et al. |
| 5,557,797 A | 9/1996 | Yano |
| 5,583,500 A | 12/1996 | Allen et al. |

(Continued)

FOREIGN PATENT DOCUMENTS

JP  58-125171  7/1983

(Continued)

OTHER PUBLICATIONS

Aase, Sven, et al., "Ringing Reduction in Low Bit-rate Image Subband Coding Using Projection onto a Space of Paraboloids," Signal Processing Image Communication, May 1, 1993, pp. 273-282, vol. 5, No. 3, Amsterdam, NL. (10 pp.).

(Continued)

*Primary Examiner* — David P Rashid

(74) *Attorney, Agent, or Firm* — Blakely, Sokoloff, Taylor & Zafman LLP

(57) ABSTRACT

A method of transferring a code of a structured document including background and at least one set of foreground and mask, to an image reproducing unit which reproduces the structured document code into a document image, includes, for each set of the foreground and mask, performing control to give priority to code of the mask over code of the foreground.

6 Claims, 15 Drawing Sheets

U.S. PATENT DOCUMENTS

| | | |
|---|---|---|
| 5,617,485 A | 4/1997 | Ohuchi et al. |
| 5,625,714 A | 4/1997 | Fukuda |
| 5,659,406 A | 8/1997 | Imao et al. |
| 5,659,631 A | 8/1997 | Gormish et al. |
| 5,675,645 A | 10/1997 | Schwartz et al. |
| 5,689,589 A | 11/1997 | Gormish et al. |
| 5,692,048 A | 11/1997 | Gormish et al. |
| 5,710,562 A | 1/1998 | Gormish et al. |
| 5,717,394 A | 2/1998 | Schwartz et al. |
| 5,734,779 A | 3/1998 | Okino |
| 5,742,704 A | 4/1998 | Suzuki et al. |
| 5,764,807 A | 6/1998 | Pearlman et al. |
| 5,787,204 A | 7/1998 | Fukuda |
| 5,812,200 A | 9/1998 | Normile |
| 5,818,531 A | 10/1998 | Yamaguchi et al. |
| 5,825,937 A | 10/1998 | Ohuchi et al. |
| 5,832,137 A | 11/1998 | Knox |
| 5,850,298 A | 12/1998 | Narahara et al. |
| 5,856,830 A | 1/1999 | Yamamoto |
| 5,867,602 A | 2/1999 | Zandi et al. |
| 5,881,176 A | 3/1999 | Keith et al. |
| 5,883,983 A | 3/1999 | Lee et al. |
| 5,910,796 A | 6/1999 | Gormish |
| 5,911,004 A | 6/1999 | Ohuchi et al. |
| 5,912,636 A | 6/1999 | Gormish et al. |
| 5,933,541 A | 8/1999 | Kutka et al. |
| 5,959,981 A | 9/1999 | Bruckert et al. |
| 5,966,465 A | 10/1999 | Keith et al. |
| 6,005,623 A | 12/1999 | Takahashi et al. |
| 6,014,473 A | 1/2000 | Hossack et al. |
| 6,023,563 A | 2/2000 | Shani |
| 6,028,965 A | 2/2000 | Normile |
| 6,031,939 A | 2/2000 | Gilbert et al. |
| 6,043,802 A | 3/2000 | Gormish |
| 6,066,978 A | 5/2000 | Kadowaki |
| 6,073,118 A | 6/2000 | Gormish et al. |
| 6,081,278 A | 6/2000 | Chen |
| 6,094,151 A | 7/2000 | Schwartz et al. |
| 6,097,842 A | 8/2000 | Suzuki et al. |
| 6,104,434 A | 8/2000 | Nakagawa et al. |
| 6,115,292 A | 9/2000 | Fukuda et al. |
| 6,137,595 A | 10/2000 | Sakuyama et al. |
| 6,141,446 A | 10/2000 | Boliek et al. |
| 6,141,453 A | 10/2000 | Banham et al. |
| 6,193,422 B1 | 2/2001 | Belt et al. |
| 6,195,465 B1 | 2/2001 | Zandi et al. |
| 6,219,454 B1 * | 4/2001 | Kawano et al. ............... 382/232 |
| 6,226,011 B1 | 5/2001 | Sakuyama et al. |
| 6,259,813 B1 | 7/2001 | Ouchi |
| 6,266,042 B1 | 7/2001 | Aratani |
| 6,266,440 B1 | 7/2001 | Oneda |
| 6,285,790 B1 | 9/2001 | Schwartz |
| 6,298,358 B1 | 10/2001 | Gormish |
| 6,335,883 B1 | 1/2002 | Fukuda et al. |
| 6,339,658 B1 | 1/2002 | Moccagatta et al. |
| 6,359,928 B1 | 3/2002 | Wang et al. |
| 6,462,681 B1 | 10/2002 | Van Der Vleuten et al. |
| 6,476,281 B2 | 11/2002 | Qian et al. |
| 6,480,623 B1 | 11/2002 | Yagishita et al. |
| RE37,940 E | 12/2002 | Imao et al. |
| 6,489,936 B1 | 12/2002 | Gormish |
| 6,492,916 B1 | 12/2002 | Schwartz et al. |
| 6,501,441 B1 | 12/2002 | Ludtke et al. |
| 6,510,246 B1 | 1/2003 | Boliek et al. |
| 6,512,793 B1 | 1/2003 | Maeda |
| 6,519,052 B1 | 2/2003 | Oneda et al. |
| 6,529,633 B1 | 3/2003 | Easwar et al. |
| 6,536,043 B1 | 3/2003 | Guedalia |
| 6,539,060 B1 | 3/2003 | Lee et al. |
| 6,545,916 B2 | 4/2003 | Fukuda et al. |
| 6,567,559 B1 | 5/2003 | Easwar |
| 6,571,052 B1 | 5/2003 | Wakimoto et al. |
| 6,606,415 B1 | 8/2003 | Rao |
| 6,650,773 B1 | 11/2003 | Maurer et al. |
| 6,661,927 B1 | 12/2003 | Suarez et al. |
| 6,668,078 B1 | 12/2003 | Bolle et al. |
| 6,668,090 B1 | 12/2003 | Joshi et al. |
| 6,668,097 B1 | 12/2003 | Hu et al. |
| 6,701,008 B1 | 3/2004 | Suino |
| 6,704,444 B2 | 3/2004 | Yagishita et al. |
| 6,707,480 B2 | 3/2004 | Ameyama et al. |
| 6,714,248 B1 | 3/2004 | Inoue |
| 6,738,093 B1 | 5/2004 | Kitagawa et al. |
| 6,754,394 B2 | 6/2004 | Boliek et al. |
| 6,756,921 B2 | 6/2004 | Kimura et al. |
| 6,757,434 B2 | 6/2004 | Miled et al. |
| 6,757,437 B1 | 6/2004 | Keith et al. |
| 6,778,698 B1 | 8/2004 | Prakash et al. |
| 6,778,709 B1 | 8/2004 | Taubman |
| 6,785,423 B1 | 8/2004 | Joshi et al. |
| 6,792,153 B1 | 9/2004 | Tsujii |
| 6,810,086 B1 | 10/2004 | Puri et al. |
| 6,813,387 B1 | 11/2004 | Berkner et al. |
| 6,847,736 B2 | 1/2005 | Itokawa |
| 6,856,706 B2 | 2/2005 | Yamada |
| 6,859,563 B2 | 2/2005 | Schwartz et al. |
| 6,865,291 B1 | 3/2005 | Zador |
| 6,873,343 B2 | 3/2005 | Chui |
| 6,873,734 B1 | 3/2005 | Zandi et al. |
| 6,879,727 B2 | 4/2005 | Sato et al. |
| 6,895,120 B2 | 5/2005 | Satoh et al. |
| 6,898,323 B2 | 5/2005 | Schwartz et al. |
| 6,898,325 B2 | 5/2005 | Gormish |
| 6,904,178 B2 | 6/2005 | Boliek et al. |
| 6,917,716 B2 | 7/2005 | Kajiwara et al. |
| 6,925,209 B2 | 8/2005 | Boliek et al. |
| 6,931,060 B1 | 8/2005 | Jiang et al. |
| 6,931,067 B2 | 8/2005 | Jang |
| 6,973,217 B2 | 12/2005 | Boliek et al. |
| 6,978,085 B1 | 12/2005 | Maeda et al. |
| 6,983,075 B2 | 1/2006 | Schwartz et al. |
| 6,983,079 B2 | 1/2006 | Kim |
| 6,987,879 B1 | 1/2006 | Suino |
| 7,006,576 B1 | 2/2006 | Hannuksela |
| 7,006,697 B1 | 2/2006 | Gormish et al. |
| 7,010,170 B2 | 3/2006 | Saito |
| 7,013,049 B2 | 3/2006 | Sakuyama |
| 7,016,545 B1 | 3/2006 | Schwartz et al. |
| 7,024,046 B2 | 4/2006 | Dekel et al. |
| 7,031,541 B2 | 4/2006 | Sakuyama |
| 7,050,640 B1 | 5/2006 | Acharya et al. |
| 7,062,103 B2 | 6/2006 | Schwartz |
| 7,068,849 B2 | 6/2006 | Zandi et al. |
| 7,072,520 B2 | 7/2006 | Schwartz et al. |
| 7,076,104 B1 | 7/2006 | Keith et al. |
| 7,079,690 B2 | 7/2006 | Boliek et al. |
| 7,088,472 B1 | 8/2006 | Okubo et al. |
| 7,095,900 B2 | 8/2006 | Schwartz et al. |
| 7,102,791 B2 | 9/2006 | Hirano et al. |
| 7,113,645 B2 | 9/2006 | Sano et al. |
| 7,120,306 B2 | 10/2006 | Okada et al. |
| 7,127,117 B2 | 10/2006 | Sano et al. |
| 7,136,532 B2 | 11/2006 | Van Der Schaar |
| 7,142,722 B2 | 11/2006 | Fukuhara et al. |
| 7,154,534 B2 | 12/2006 | Seki et al. |
| 7,155,059 B2 | 12/2006 | Yagishita et al. |
| 7,158,679 B2 | 1/2007 | Sano et al. |
| 7,158,682 B2 | 1/2007 | Sano |
| 7,167,592 B2 | 1/2007 | Zandi et al. |
| 7,174,091 B2 | 2/2007 | Umeda |
| 7,177,488 B2 | 2/2007 | Berkner et al. |
| 7,196,641 B2 | 3/2007 | Huang et al. |
| 7,206,459 B2 | 4/2007 | Berkner et al. |
| 7,215,820 B2 | 5/2007 | Zandi et al. |
| 7,221,466 B2 | 5/2007 | Ishii et al. |
| 7,228,000 B2 | 6/2007 | Sakuyama |
| 7,239,242 B2 | 7/2007 | Ghosh |
| 7,245,775 B2 | 7/2007 | Kodama et al. |
| 7,272,258 B2 | 9/2007 | Berkner et al. |
| 7,277,596 B2 | 10/2007 | Suino |
| 7,292,728 B1 | 11/2007 | Gupta et al. |
| 7,302,104 B2 | 11/2007 | Suino |
| 7,310,447 B2 | 12/2007 | Yano et al. |
| 7,313,284 B2 | 12/2007 | Suino et al. |
| 7,315,651 B2 | 1/2008 | Sakuyama et al. |
| 7,327,874 B2 | 2/2008 | Shibaki et al. |
| 7,330,596 B2 | 2/2008 | Suino et al. |

| | | |
|---|---|---|
| 7,336,852 B2 | 2/2008 | Nomizu et al. |
| 7,349,579 B2 | 3/2008 | Kadowaki et al. |
| 7,352,907 B2 | 4/2008 | Sakuyama et al. |
| 7,355,755 B2 | 4/2008 | Suino et al. |
| 7,372,999 B2 | 5/2008 | Oneda et al. |
| 7,373,007 B2 | 5/2008 | Sakuyama et al. |
| RE40,405 E | 6/2008 | Schwartz et al. |
| 7,386,175 B2 | 6/2008 | Hara et al. |
| 7,386,176 B2 | 6/2008 | Oneda et al. |
| 7,394,470 B2 | 7/2008 | Nishimura et al. |
| 7,403,310 B2 | 7/2008 | Miyagi et al. |
| 7,409,060 B2 | 8/2008 | Nomizu et al. |
| 7,409,095 B2 | 8/2008 | Sakuyama et al. |
| 7,423,781 B2 | 9/2008 | Morimoto et al. |
| 7,430,327 B2 | 9/2008 | Kodama et al. |
| 7,433,082 B2 | 10/2008 | Takenaka et al. |
| 7,433,523 B2 | 10/2008 | Sakuyama et al. |
| 7,447,369 B2 | 11/2008 | Gormish et al. |
| 7,450,768 B2 | 11/2008 | Sakuyama et al. |
| 7,450,773 B2 | 11/2008 | Nomizu et al. |
| 7,454,069 B2 | 11/2008 | Kodama et al. |
| 7,460,724 B2 | 12/2008 | Gormish |
| 7,466,453 B2 | 12/2008 | Miyagi et al. |
| 7,474,792 B2 | 1/2009 | Kadowaki et al. |
| 7,477,792 B2 | 1/2009 | Wu et al. |
| 7,505,630 B2 | 3/2009 | Sakuyama et al. |
| 7,526,133 B2 | 4/2009 | Nomizu et al. |
| 7,542,611 B2 | 6/2009 | Yano et al. |
| 7,545,938 B2 | 6/2009 | Nomizu et al. |
| 7,581,027 B2 | 8/2009 | Boliek et al. |
| 7,583,847 B1 | 9/2009 | Boliek et al. |
| 7,593,578 B2 | 9/2009 | Sakuyama et al. |
| 7,609,899 B2 | 10/2009 | Suino |
| 7,626,733 B2 | 12/2009 | Kodama et al. |
| 7,660,473 B2 | 2/2010 | Gormish |
| 7,667,713 B2 | 2/2010 | Suino et al. |
| 7,711,834 B2 | 5/2010 | Gormish |
| 7,734,824 B2 | 6/2010 | Gormish et al. |
| 2001/0024530 A1 | 9/2001 | Fukuhara et al. |
| 2001/0028404 A1 | 10/2001 | Fukuhara et al. |
| 2001/0033392 A1 | 10/2001 | Utsunomiya |
| 2001/0048770 A1* | 12/2001 | Maeda .................. 382/243 |
| 2002/0018597 A1 | 2/2002 | Kajiwara et al. |
| 2002/0021843 A1 | 2/2002 | Fukuhara et al. |
| 2002/0097335 A1 | 7/2002 | Kobayashi et al. |
| 2002/0099853 A1 | 7/2002 | Tsujii et al. |
| 2002/0154331 A1 | 10/2002 | Yamauchi et al. |
| 2002/0154826 A1 | 10/2002 | Okada |
| 2002/0159644 A1 | 10/2002 | Sakuyama |
| 2002/0172429 A1 | 11/2002 | Boliek et al. |
| 2003/0002742 A1 | 1/2003 | Sano et al. |
| 2003/0048272 A1 | 3/2003 | Gormish |
| 2003/0068089 A1 | 4/2003 | Sano et al. |
| 2003/0118107 A1 | 6/2003 | Itakura et al. |
| 2003/0123729 A1* | 7/2003 | Mukherjee et al. ......... 382/176 |
| 2003/0142872 A1 | 7/2003 | Koyanagi |
| 2003/0151676 A1 | 8/2003 | Seki et al. |
| 2003/0161536 A1 | 8/2003 | Iwamura et al. |
| 2003/0218776 A1 | 11/2003 | Morimoto et al. |
| 2004/0013310 A1 | 1/2004 | Suino et al. |
| 2004/0061883 A1 | 4/2004 | Kanatsu |
| 2004/0095477 A1 | 5/2004 | Maki et al. |
| 2004/0114813 A1 | 6/2004 | Boliek et al. |
| 2004/0126020 A1 | 7/2004 | Sakuyama et al. |
| 2004/0134978 A1 | 7/2004 | Hara et al. |
| 2004/0136596 A1 | 7/2004 | Oneda et al. |
| 2004/0146209 A1 | 7/2004 | Kadowaki et al. |
| 2004/0151385 A1 | 8/2004 | Oneda et al. |
| 2004/0163038 A1 | 8/2004 | Yano et al. |
| 2004/0179237 A1 | 9/2004 | Takenaka et al. |
| 2004/0202371 A1 | 10/2004 | Kodama et al. |
| 2004/0205199 A1 | 10/2004 | Gormish |
| 2004/0208379 A1 | 10/2004 | Kodama et al. |
| 2004/0212843 A1 | 10/2004 | Kodama et al. |
| 2004/0218817 A1 | 11/2004 | Kodama et al. |
| 2004/0228537 A1 | 11/2004 | Yeung et al. |
| 2004/0264785 A1 | 12/2004 | Suino et al. |
| 2005/0015247 A1 | 1/2005 | Sakuyama et al. |
| 2005/0031212 A1 | 2/2005 | Suino |
| 2005/0074172 A1 | 4/2005 | Kodama |
| 2005/0105807 A1 | 5/2005 | Suino et al. |
| 2006/0001905 A1 | 1/2006 | Utsunomiya |
| 2006/0056509 A1 | 3/2006 | Suino et al. |
| 2006/0188175 A1 | 8/2006 | Takiguchi et al. |
| 2007/0237409 A1 | 10/2007 | Atsumi et al. |

FOREIGN PATENT DOCUMENTS

| | | |
|---|---|---|
| JP | 63-148790 | 6/1988 |
| JP | 05-014735 | 1/1993 |
| JP | 05-031085 | 2/1993 |
| JP | 05-048835 | 2/1993 |
| JP | 05-089284 | 4/1993 |
| JP | 05-227518 | 9/1993 |
| JP | 05-298015 | 11/1993 |
| JP | 05-316361 | 11/1993 |
| JP | 06-038188 | 2/1994 |
| JP | 06-054311 | 2/1994 |
| JP | 06-152884 | 5/1994 |
| JP | 06-230608 | 8/1994 |
| JP | 06-245003 | 9/1994 |
| JP | 06-326990 | 11/1994 |
| JP | 07-87295 | 3/1995 |
| JP | 07-124131 | 5/1995 |
| JP | 08-186816 | 7/1996 |
| JP | 08-242336 | 9/1996 |
| JP | 09-81165 | 3/1997 |
| JP | 09-160574 | 6/1997 |
| JP | 09-253062 | 9/1997 |
| JP | 09-307855 | 11/1997 |
| JP | 10-136352 | 5/1998 |
| JP | 10-191335 | 7/1998 |
| JP | 10-229484 | 8/1998 |
| JP | 10-282978 | 10/1998 |
| JP | 11-088866 | 3/1999 |
| JP | 11-098505 | 4/1999 |
| JP | 11-177977 | 7/1999 |
| JP | 11-187266 | 7/1999 |
| JP | 11-231881 | 8/1999 |
| JP | 2940422 | 8/1999 |
| JP | 11-285006 | 10/1999 |
| JP | 3003618 | 11/1999 |
| JP | 2000-092485 | 3/2000 |
| JP | 2000-101537 | 4/2000 |
| JP | 2000-115245 | 4/2000 |
| JP | 2000-115542 | 4/2000 |
| JP | 2000-244919 | 9/2000 |
| JP | 2001-045098 | 2/2001 |
| JP | 2001-223903 | 8/2001 |
| JP | 2001-238189 | 8/2001 |
| JP | 2001-245294 | 9/2001 |
| JP | 2001-257596 | 9/2001 |
| JP | 2001-257979 | 9/2001 |
| JP | 2001-258031 | 9/2001 |
| JP | 3228086 | 9/2001 |
| JP | 2001-274861 | 10/2001 |
| JP | 2001-275119 | 10/2001 |
| JP | 2001-309381 | 11/2001 |
| JP | 2001-326936 | 11/2001 |
| JP | 2001-333430 | 11/2001 |
| JP | 2001-346047 | 12/2001 |
| JP | 2001-346208 | 12/2001 |
| JP | 2001-359048 | 12/2001 |
| JP | 2001-359074 | 12/2001 |
| JP | 2002-034043 | 1/2002 |
| JP | 2002-044671 | 2/2002 |
| JP | 2002-064710 | 2/2002 |
| JP | 2002-064830 | 2/2002 |
| JP | 3281423 | 2/2002 |
| JP | 2002-135127 | 5/2002 |
| JP | 2002-152500 | 5/2002 |
| JP | 2002-176650 | 6/2002 |
| JP | 2002-247580 | 8/2002 |
| JP | 2002-261860 | 9/2002 |
| JP | 2002-262288 | 9/2002 |
| JP | 2002-289807 | 10/2002 |
| JP | 2002-300468 | 10/2002 |
| JP | 2002-300476 | 10/2002 |
| JP | 2003-016455 | 1/2003 |

| | | |
|---|---|---|
| JP | 2003-058878 | 2/2003 |
| JP | 2003-092760 | 3/2003 |
| JP | 2003-224846 | 8/2003 |
| JP | 2004-056260 | 1/2004 |
| JP | 2004-056264 | 1/2004 |
| JP | 2004-040252 | 2/2004 |
| JP | 2004-040670 | 2/2004 |
| JP | 2004-046583 | 2/2004 |
| JP | 2004-064190 | 2/2004 |
| JP | 2004-104650 | 4/2004 |
| JP | 2004-112004 | 4/2004 |
| JP | 2004-134938 | 4/2004 |
| JP | 2004-194062 | 7/2004 |
| JP | 2004-350034 A | 12/2004 |
| JP | 2004350158 A | 12/2004 |

OTHER PUBLICATIONS

Barzykina, Ekaterina, et al., "Removal of Blocking Artifacts using Random Pattern Filtering," Image Processing, 1999, ICIP '99, Proceedings, 1999 Int'l. Conf. in Kobe, Japan, Oct. 24-28, 1999, Piscataway, New Jersey, U.S.A., IEEE, USA., Oct. 24, 1999, pp. 904-908. (6 pp.).

Guillemaud, R., "Uniformity Correction with Homomorphic Filtering on Region of Interest," Image Processing, 1998, ICIP '98, Proceedings, 1998 Int'l Conference in Chicago, IL, Oct. 4-7, 1998, Los Alamitos, California, IEEE Comput. Soc., Oct. 4, 1998, pp. 872-875. (4 pp.).

Katto, Jiro, et al., "Performance Evaluation of Subband Coding and Optimization of Its Filter Coefficients," Journal of Visual Communication and Image Representation vol. 2, No. 4, Dec. 1991, pp. 303-313. (13 pp.).

Kim, Nam Chul, et al., "Reduction of Blocking Artifact in Block-Coded Images Using Wavelet Transform," IEEE Transactions on Circuits and Systems for Video Technology, vol. 8, No. 3, Jun. 1998, pp. 253-257. (6 pp.).

Kuge, Tetsuro, Wavelet Picture Coding and its Several Problems of the Application to the Interface HDTV and the Ultra-High Definition Images, IEEE 2002. (4 pp.).

Muramatsu, et al., "A Design Method of Invertible De-Interlacer with Sampling Density Preservation," IEEE 2002. (4 pp.).

Nadenau, Marcus J., et al., "Opponent Color, Human Vision and Wavelets for Image Compression," Proceedings of the Seventh Color Imaging Conference, Scottsdale Arizona, Nov. 16-19, 1999, IS&T, pp. 237-242. (6 pp.).

Nadenau, Marcus J., et al., "Wavelet-Based Color Image Compression: Exploiting the Contrast Sensitivity Function," IEEE Transactions on Image Processing, vol. 12, No. 1, Jan. 2003, pp. 58-70. (13 pp.).

Nomizu, Yasuyuki, "Next-generation Image Encoding Method JPEG 2000," Triceps Inc., Feb. 13, 2001. (107 pp.).

Oguz, S.H., et al., "Image Coding Ringing Artifact Reduction Using Morphological Post-Filtering," IEEE Second Workshop on Redondo Beach, California, Dec. 7-9, 1998, pp. 628-633, Multimedia Signal Processing, 1998 Piscataway, New Jersey, U.S. (6 pp.).

Rabiee, H. R, et al., "Image De-Blocking with Wavelet-Based Multiresolution, Analysis and Spatially Variant OS Filters," Proceedings, Int'l. Conf. in Santa Barbara, California, U.S.A., Oct. 26-29, 1997, Los Alamitos, California, USA, IEEE Comput. Soc., U.S.A., Oct. 26, 1997, pp. 318-321. (4 pp.).

Ramamurthi, Bhaskar, et al., "Nonlinear Space-Variant Postprocessing of Block Coded Images, "IEEE Transactions on Acoustics, Speech, and Signal Processing, Oct. 1, 1986, pp. 1258-1268, vol. 34, No. 5, IEEE Inc., New York, U.S. (11 pp.).

Shen, Mei-Yin et al., "Real-Time Compression Artifact Reduction Via Robust Nonlinear Filtering," Image Processing, 1999, ICIP '99, Proceedings, 1999 Int'l. Conf. in Kobe, Japan, Oct. 24-28, 1999, Piscataway, New Jersey, U.S.A., IEEE, U.S.A., Oct. 24, 1999, pp. 565-569. (6 pp.).

Taubman, et al., JPEG2000: Image Compression Fundamentals, Standards and Practice, The Kluwer International Series in Engineering and Computer Science, ISBN 0-792307519-X, Kluwer Academic Publishers, 2002. (16pp.).

Vandendorpe, et al., "Human Visual Weighted Quantization for Transform/Subband Image Coding Revisited for Interfaced Pictures," IEEE Transactions on Image Processing; vol. 7, No. 2, pp. 222-225, Feb. 1998. (4pp.).

Vidaurrazaga, M., et al., "Contrast Enhancement with Wavelet Transform in Radiological Images," Proceedings, 22nd Annual Embs Int'l. Conf., vol. 3, Jul. 23-28, 2000, Chicago, Illinois, pp. 1760-1763. (4 pp.).

Sections 6-7, Annex D.5, J.7 and J.14, ISO/IED 15444.1, $1^{st}$ Edition, Dec. 15, 2000. (11 pp.).

Section A.4.2 of ISO/IEC FCD15444-1:2000, JPEG 2000 Part 1 Final Committee Draft Version 1.0, pp. 22-23. (2 pp.).

European Search Report, Application No. 02028798.3, mailed Sep. 4, 2003. (10 pp.).

European Search Report, Application No. 02028798.3-1247, mailed Jul. 4, 2003. (6 pp.).

A Computer Translated of JP Patent Publication No. 09-160574 to Hiroyuki, Published on Jun. 20, 1997. (39 pp.).

Japanese Office Action for Japanese Patent Application No. JP 2003-328637, dated Sep. 9, 2009. (2 pp.) *No English translation provided*.

Japanese Office Action for JP-2004-159631, dated Feb. 20, 2008. (2 pp.) *No English translation provided*.

Japanese Office Action, Notice for Application. No. JP 2003-196216, mailed Aug. 12, 2008. (2 pp.) *No English translation provided*.

Japanese Office Action, Notice of Rejection of Japanese Application No. JP 2003-196216, Issue date May 13, 2008. (2pp.) *No English translation provided*.

Japanese Office Action, Notice of Rejection of Japanese Patent Application. No. 2002-262243, Issue Date Aug. 7, 2007. (2 pp.) *No English translation provided*.

Japanese Patent Application No. JP2003-327631, Notice of Rejection issued on Apr. 30, 2008. (2pp.) *No English translation provided*.

Japanese Office Action, Notice of Rejection of Japanese Patent Application No. 2002-345237, Issue Date Feb. 20, 2007. (2 pp) *No English translation provided*.

Japanese Office Action for Application. No. JP-2001-400647, mailed Feb. 6, 2007. (2pp) *No English translation provided*.

Japanese Office Action, Notice of Rejection of Japanese Patent Application No. JP 2002-332173, Issue date Mar. 20, 2007. (2 pp.) *No English translation provided*.

Japanese Office Action, Notice of Rejection of Japanese Patent Application No. JP 2002-331723, Issue date Mar. 20, 2007. (2 pp.) *No English translation provided*.

Japanese Notice of Rejection for Japanese Application. No. JP 2002-329553, Issue date May 16, 2007. (2 pp.) *No English translation provided*.

U.S. Appl. No. 08/316,116, filed Sep. 30, 1994, now abandoned.

Japanese Patent Application for corresponding Japanese Patent Application No. 2005-131203, Aug. 11, 2010, 1 pg.

* cited by examiner

FIG.2
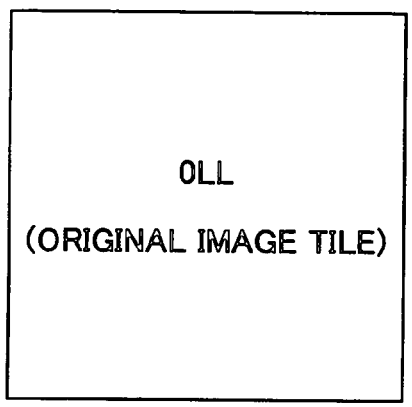
(a) DECOMPOSITION_LEVEL_0
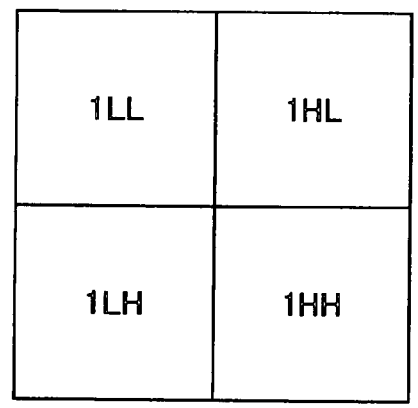
(b) DECOMPOSITION_LEVEL_1
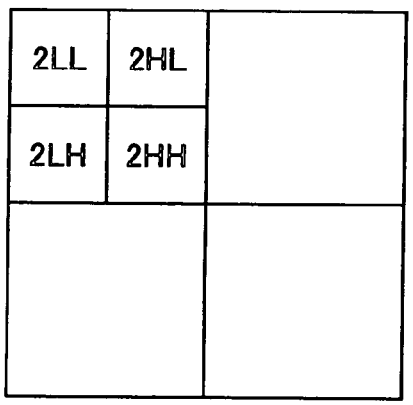
(c) DECOMPOSITION_LEVEL_2
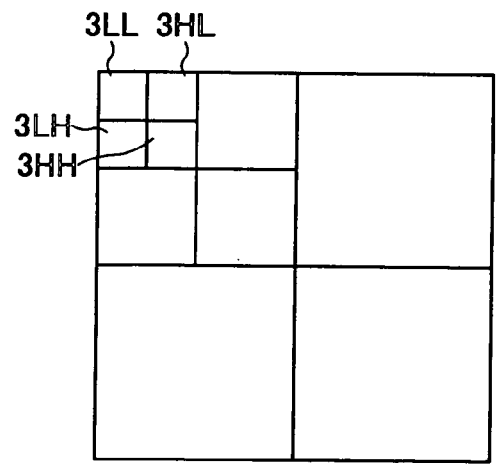
(d) DECOMPOSITION_LEVEL_3

IMAGE REPRODUCTION ACCORDING TO JPM

EXAMPLE OF JPM IMAGE REPRODUCTION $$PageImage_0[c][x,y] = BaseImage[c][x,y]$$

$$PageImage_m[c][x,y] = \frac{(S_m - M_m[x,y]) \times PageImage_{m-1}[c][x,y] + M_m[x,y] \times I_m[c][x,y]}{S_m}$$

$$PageImage[c][x,y] = PageImage_n[c][x,y]$$

BLENDING (IMAGE REPRODUCTION) METHOD (a) MASK IS SENT  (b) BACKGROUND IS SENT  (c) FOREGROUND IS SENT (a) DIVIDED MASK  (b) BLOCK DETERMINATION  (c) BLOCK NUMBER

ORDERLY STRUCTURED DOCUMENT CODE TRANSFERRING METHOD USING CHARACTER AND NON-CHARACTER MASK BLOCKS

The present application claims priority to and incorporates by reference the entire contents of Japanese priority document 2005-131203, filed in Japan on Apr. 28, 2005.

BACKGROUND OF THE INVENTION

1. Field of the Invention

The present invention relates to a transferring method, an image processing system and a server system, handling a MRC or JPM structured document code.

2. Description of the Related Art

According to a method called MRC (mixed raster content), each page of a document including characters and images in a mixed manner is divided into three layers, i.e., foreground (color information of characters); mask (character area information); and background (image information), and each layer is coded. Japanese Patent No. 3275807 and Japanese Laid-open Patent Application No. 2001-223903 disclose related arts.

Further, recently, JPEG2000 (IS 15444-6) which is suitable to compress a high-definition image has received much attention, and JPM (JPEG2000 Multi Layer) has been standardized (IS 15444-6) on October 2003. It has been mentioned that JPEG2000 may be selected as a method of coding the foreground, mask and background of the MRC model. JPEG2000 and JPM will now be generally described.

Outline of JPEG2000

FIG. 1 is a block diagram illustrating a JPEG2000 algorithm. A color image is divided into tiles which do not overlap each other (the number of tile divisions$\geq 1$), for each component. Compression/decompression is performed separately for each tile for each component.

Compression/coding operation is performed as follows. Data of each tile of each component is transformed from, for example, an RGB space into a YCbCr space by a color space transform/invert transform unit 111. Then, a two-dimensional wavelet transform/inverse transform unit 112 performs a two-dimensional wavelet transform (forward transform) and spatially divides the thus-obtained data into subbands (frequency bands).

FIG. 2 shows a state of the subband divided data when the number of decomposition levels is 3. Two-dimensional wavelet transform is performed on a tile image shown in FIG. 2(a), obtained from the tile dividing from the original image, and thus, subband decomposition is made in the 1LL, 1HL, 1LH and 1HH subbands as shown in FIG. 2(b). A two-dimensional wavelet transform is then performed on the 1LL subband coefficients which are a low-frequency component of the decomposition level 1 thereof. As a result, it is decomposed into the 2LL, 2HL, 2LH and 2HH subbands shown in FIG. 2(c). A two-dimensional wavelet transform is then performed on the 2LL subband coefficients in the decompression level 2 thereof. As a result, it is decomposed into the 3LL, 3HL, 3LH and 3HH subbands shown in FIG. 2(d).

Returning to FIG. 1, in JPEG2000, a lossy wavelet transform called a '9×7 transform' and a lossless wavelet transform called '5×3 transform' are prescribed. When the 9×7 transform is applied, a quantization/inverse quantization unit 113 performs linear quantization on the wavelet coefficients for each subband. Then, the bits to encode are determined in the specified coding order, and the quantization/inverse quantization unit 113 generates a context from the peripheral bits of the target bit. An entropy coding/decoding unit 114 performs entropy coding on the wavelet coefficients from the context and the target bit according to a probability estimation.

In further detail, as shown in FIG. 3, each subband is divided into rectangular areas that do not overlap each other called precincts. Three rectangular areas spatially coincident among the LH, HL and HH subbands of the common decomposition level are regarded as one precinct. However, for the LL subband, a single rectangular area is regarded as one precinct. Roughly speaking, the precinct indicates a position in the given image. Code blocks are obtained when the precinct is then divided into rectangles, and are units for the entropy coding. According to JPEG2000, entropy coding called MQ coding is performed for each code block of the wavelet coefficients in the order of bit planes (bit plane coding).

A tag processing part 115 discards unnecessary entropy code, generates a packet by collecting necessary entropy code, arranges the packets in a predetermined order, and attaches thereto a necessary header. Thus, one code stream (coded data) is produced.

The 'packet' means one collection of the code of the code blocks included in the precinct. For example, the bit planes of the code of MSB through the third plane of all the code blocks are collected. Then, the packet header is attached thereto. The packet has component, resolution level, precinct and layer attributes.

The relationship between the resolution level and the decomposition level is now described for the example of FIG. 2. 3LL subband has the resolution level 0, while 3HL, 3LH and 3HH subbands have the resolution level 1. 2HL, 2LH and 2HH subbands of the decomposition level 2 have the resolution level 2; and 1HL, 1LH and 1HH subbands of the decomposition level 1 has the resolution level 3.

As to the layer, when the packets of the entire precincts (i.e., all the code blocks) are collected, a part of the entire image (for example, the codes of the MSB through the third bit plane of the wavelet coefficients of the entire image) is obtained. This is called a 'layer'.

FIG. 4 shows a general structure of the code stream. Tag information called a main header and a tile-part header are attached to the top of the code stream and the top of partial tile of each tile. Then, subsequent to the tile-part header, the tile's packet sequence follows (bit stream). Finally, the tag ('end of code stream') is attached.

Decompression (decoding) processing is performed in a procedure reverse to the above-described coding processing, and, from the code stream of each tile of each component, image data is generated. Briefly describing with reference to FIG. 1, the tag information attached to the code stream input externally is interpreted by the tag processing unit 115. Then the code stream is decomposed into those of the respective tiles for each component. For the code stream of each tile of each component, decoding is performed. A bit position is determined for a target bit to decode in the order according to the tag information included in the code stream. Further, the quantization/inverse quantization unit 113 generates context from the arrangement of the peripheral bits (already decoded) of the target bit. The entropy coding/decoding unit 114 generates the target bit from decoding (MQ decoding) by use of a probability estimation with the use of the context and the code stream. The bit that is generated is written at the corresponding position of the page. The decoded wavelet coefficients that are obtained then undergo, if necessary, inverse quantization by the quantization/inverse quantization unit 113. After that, the two-dimensional wavelet transform/inverse transform unit 112 performs an inverse wavelet transform, and thus, each tile image of each component is reproduced. The reproduced data is transformed into the original color system of data by use of the color space transform/inverse transform unit 111.

Outline of JPM

FIG. 5 illustrates an outline of JPM. A page of a document includes at least one set of a layout object and a base object (background). The base object includes parameter specification, and, ordinarily, a single color or transparent. The layout object includes an image (foreground) and a mask. The image stores ordinary image data. The mask indicates opacity. Ordinarily, the layout object includes sets of images and masks. However, the layout object may be one which includes only either one. When the layout object includes only images, all the masks are regarded as "1", which means 'overwriting'. When the layout object includes only marks, the images have values to specify. It is noted that scaling and clipping can be made on either one of image and mask (see FIG. 7).

FIG. 6 illustrates an example of page image reproduction of the JPM structured document. In a lower part of FIG. 6, arithmetic expressions for image reproduction are shown.

First, the base page is PageImge_0 (background 0). Then, PageImage_1 is produced from PageImge_0 and Image_0 (foreground 0) and Mask_0 (mask 0) of the first layout object. That is, the opacity is 1 at a black pixel position of Mask_0, and Image_0 is overwritten on PageImge_0. At a white pixel position of Mask_0, the transparency is 1, and thus, PageImge_0 is displayed. Similarly, PageImge_2 (background 2) is produced from PageImage_1 (background 1), as well as Image_1 (foreground 1) and Mask_1 (mask 1) of the second layout object. Thus, Image_1 is overwritten at the black pixel position of Mask_1 on PageImage_1, while PageImge_1 is displayed at the while pixel position of Mask_1. In this example, PageImage_2 is the reproduced image finally displayed.

The second expression shown in the lower part of FIG. 6 is the arithmetic expression for blending background and foreground. Mm and Im denote the mask pixel value in the m-th layout object and the image (foreground) pixel value, respectively. 'c' denotes the component. Mask is of a single component. [x,y] denotes the pixel coordinate, and Sm denotes the Mm's maximum value ((power of 2)−1). 'n' denotes the number of layout objects.

The above-mentioned second arithmetic expression is further described. In the example of FIG. 6, the mask has a binary value (one bit for each pixel). Thus, $Sm=2^1-1=1$. Accordingly, when the mask value is 1, the combined image value equals the foreground value. When the mask value is 0, the combined image value equals the background value. That is, either one of the foreground value and the background value is selected by the mask value. However, the mask may have a multilevel value. That is, when each pixel of the mask has an 8-bit positive value (including 0), $Sm=2^8-1=255$. Accordingly, in this case, the combined pixel value=((255−mask value)/255)×background value+(mask value/255)×foreground value. Thus, a value obtained from 'weighted averaging' of the foreground value and the background value becomes the combined image value. Thus, the mask has a function of controlling a display ratio between the foreground and the background.

Next, the mask scaling and clipping are described with reference to FIG. 7. A decoded mask (see FIG. 7(a)) can be changed in size separately in a vertical direction and in a horizontal direction (see 7(b)). When only a part of the mask is used, the part of the mask should be clipped out (see 7(c)). Then, the thus-clipped-out part of the mask may be allocated at any position of the page (see 7(d)). The mask part may further be subject to clipping after the allocation (see 7(e)). Also as to the foreground, the scaling/clipping can be made in the same manner.

SUMMARY OF THE INVENTION

A structured document code transferring method, image processing system, server apparatus and computer readable information recording medium are described. In one embodiment, a method of transferring code of a structured document comprising background and at least one set of foreground and mask, to an image reproducing unit that reproduces a document image from the structured document code, comprises, for each set of the foreground and the mask, performing a control to give priority to the code of the mask over the code of the foreground.

Thus, from a structured document code, including 'background and at least one set of foreground and mask' (when only one set of foreground and mask is included, it including 'background, foreground and mask'), a document image can be reproduced in the above-described procedure.

BRIEF DESCRIPTION OF DRAWINGS

Other embodiments and further features of the present invention will become more apparent from the following detailed description when read in conjunction with the accompanying drawings:

FIG. 2 illustrates a two-dimensional wavelet transform.

DETAILED DESCRIPTION

Figure 1:
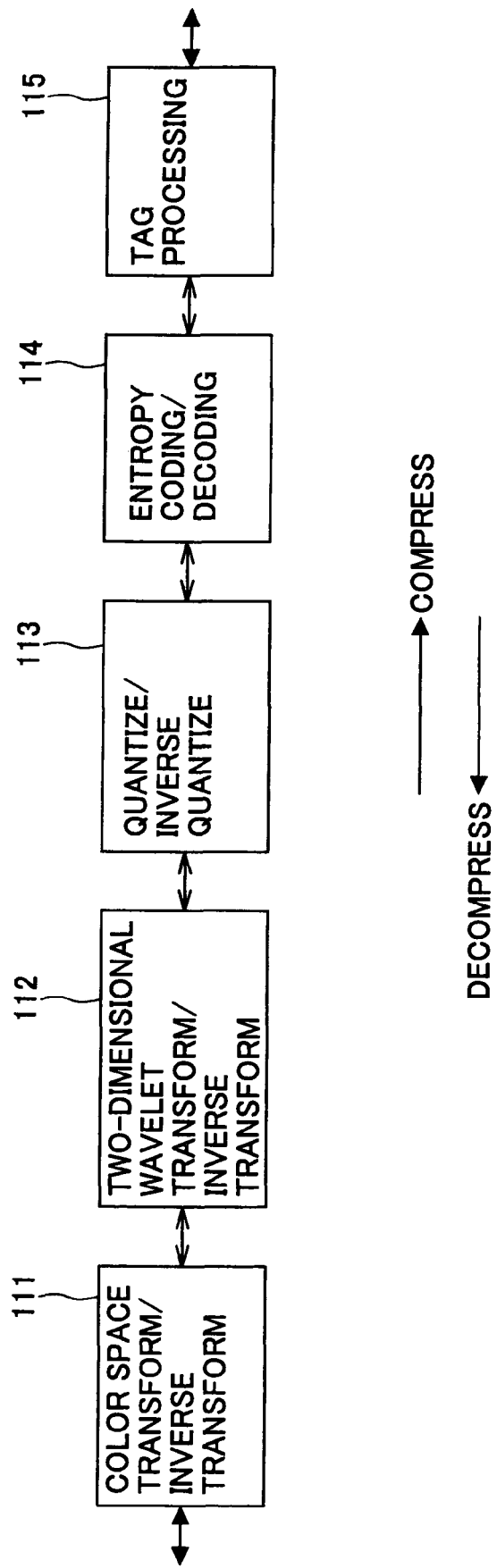
FIG. 1 illustrates a JPEG2000 algorithm.
Figure 3:
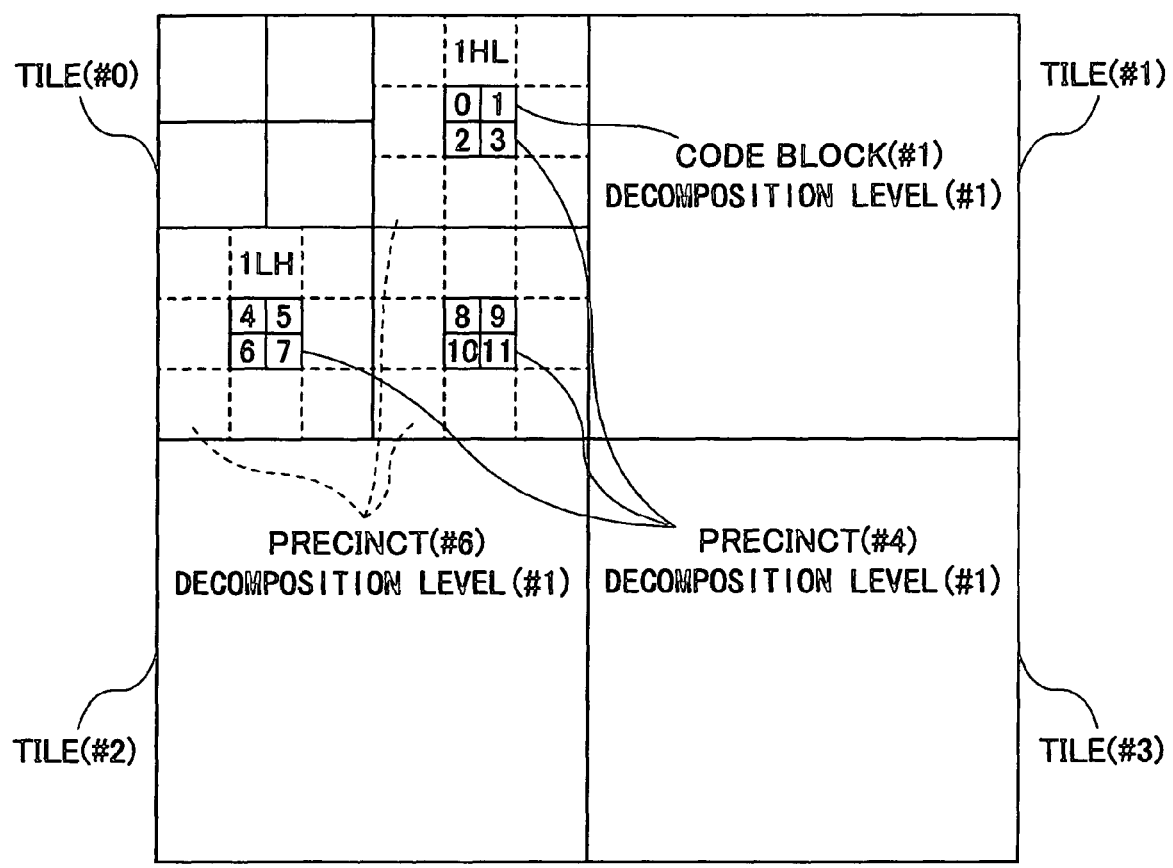
FIG. 3 illustrates tiles, precincts and code blocks.
Figure 4:
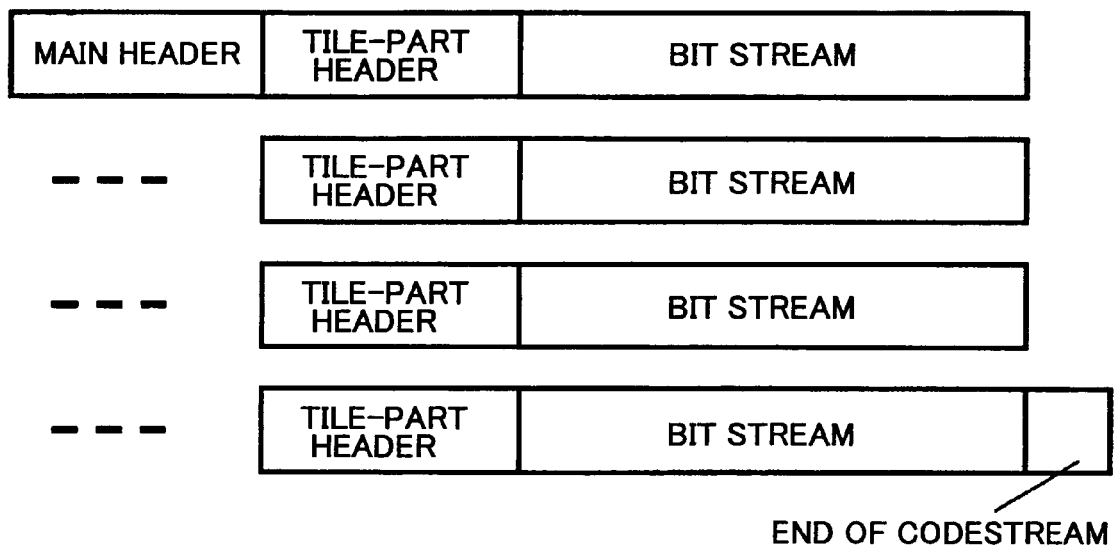
FIG. 4 illustrates a JPEG2000 code stream.
Figure 5:
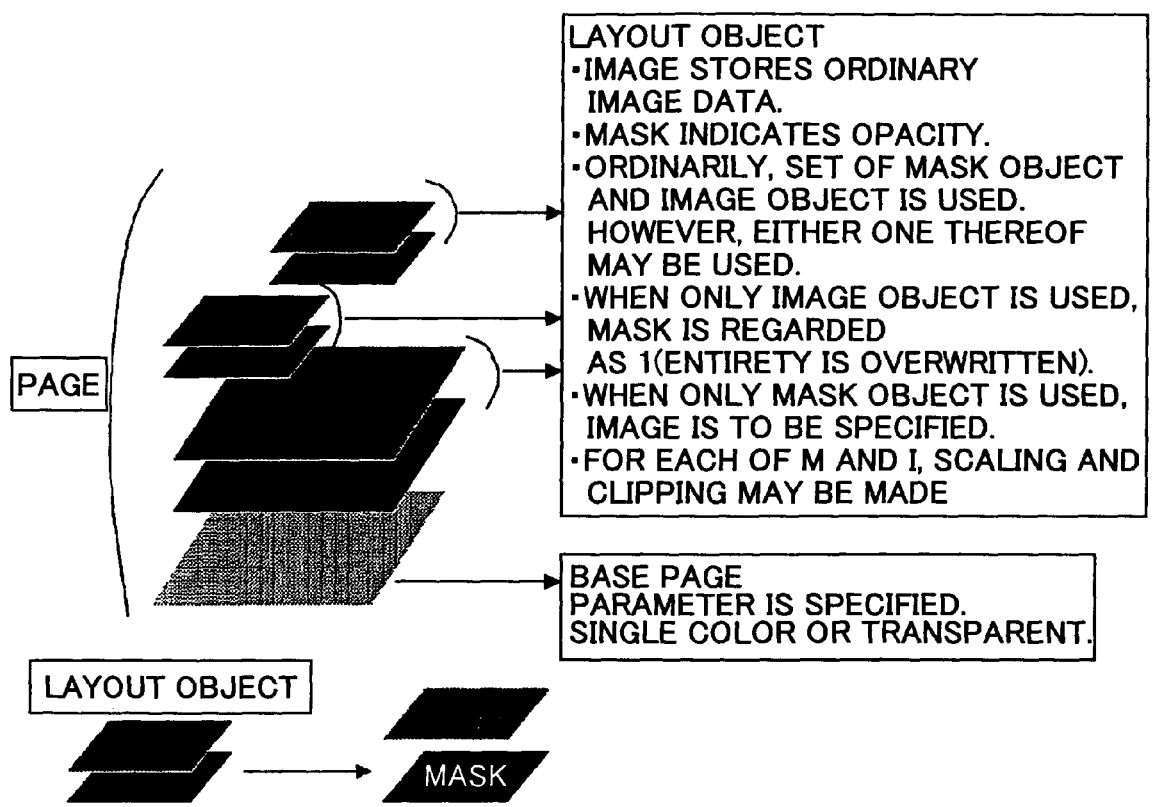
FIG. 5 illustrates an outline of JPM.
Figure 6:
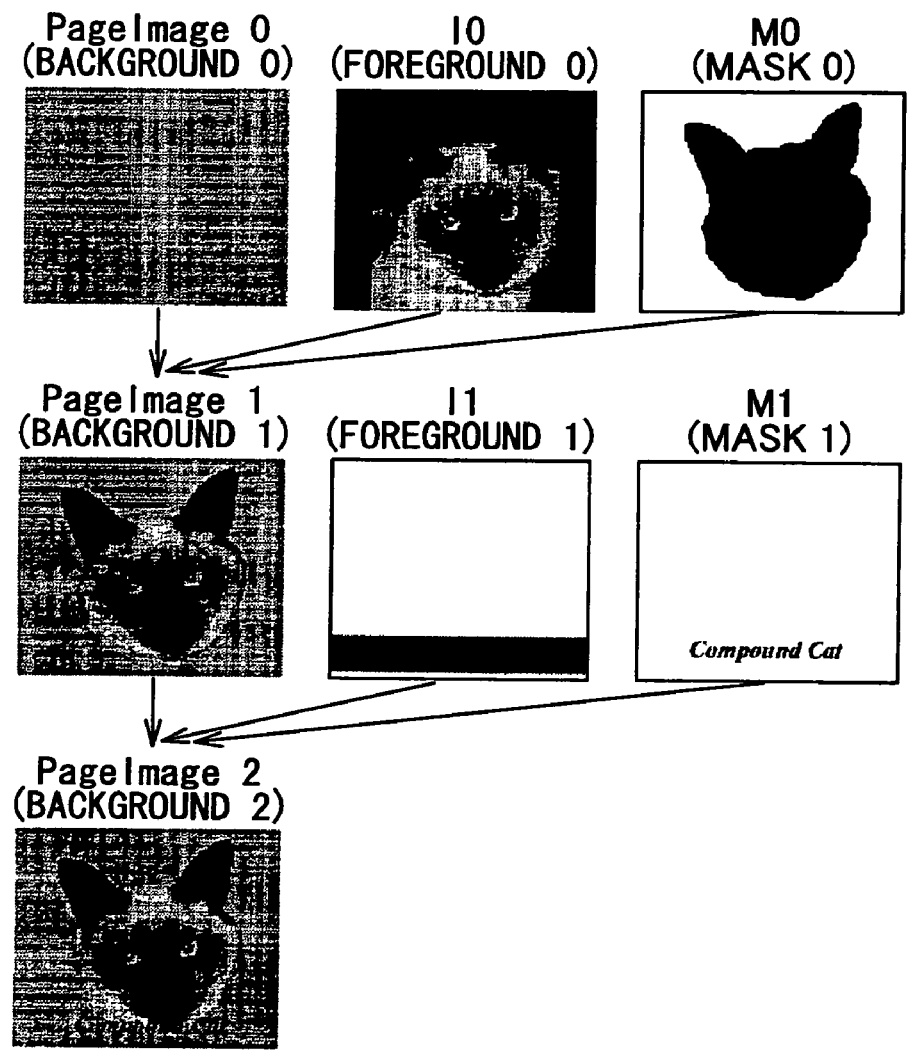
FIG. 6 illustrates a document image reproducing procedure.
Figure 7:
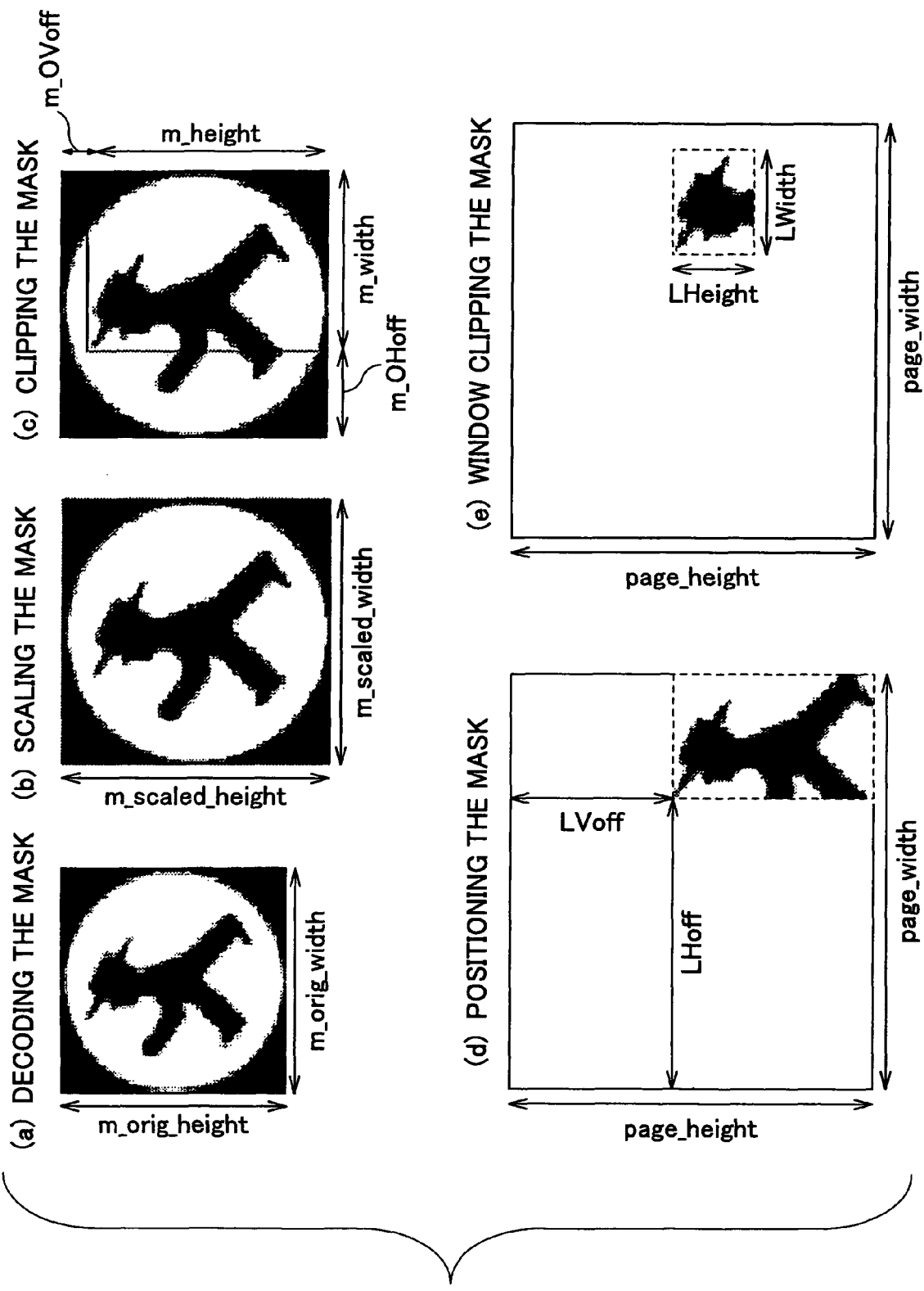
FIG. 7 illustrates scaling/clipping of a mask.

Embodiments of the present invention include a structured document code transferring method, an image processing system and a server apparatus, by which, when a document image is reproduced from such a structured document code, significant information of the document can be obtained efficiently at an earlier stage, and a computer readable information recording medium storing program for achieving the method.

According to one embodiment of the present invention, a control is made such that, for each set of foreground and mask, the code of the mask is given priority, over the code of the foreground, upon transferring the structured document code.

The present invention may be performed in any one of following modes 1 through 18. In mode 1, a method of transferring a code of a structured document including background and at least one set of foreground and mask, to an image reproducing part that reproduces the structured document code into a document image, includes, for each set of foreground and mask, performing control such as to give priority to the code of mask over the code of foreground.

In mode 2, the structured document code transferring method in mode 1 includes performing a control to transfer the structured document code having a single set of foreground and mask, in an order of the mask, the background, and then the foreground.

In mode 3, the structured document code transferring method in mode 1 or 2 includes transferring the code of mask of the structured document, in block units, which correspond to division areas of the mask.

In mode 4, in the structured document code transferring method in mode 3, the code of mask of the structured document has a divided plurality of tiles of JPEG2000 code, and the tiles correspond to the blocks.

In mode 5, in the structured document code transferring method in mode 3 or 4, a determination is made as to whether the block of the mask of the structured document corresponds to a character block or a non-character block, and, based on the determination result, a control is performed such that the transfer of the character block is given priority over the transfer of the non-character block.

In mode 6, in the structured document code transferring method in any one of modes 1 through 5, the image reproducing unit is included in a client apparatus that is connected with a server apparatus via a communication network, and the structured document is transferred from the server apparatus to the client apparatus via the communication network.

In mode 7, an image processing system includes an image reproducing unit reproduces a document image from code of a structured document including a background and at least one set of a foreground and a mask; and a transferring unit transferring the structured document code to the image reproducing unit, wherein: the transferring unit includes an order control unit controlling a transferring order of the structured document code; and the order control part performs a control such as to give priority to the code of mask over the code of foreground.

In mode 8, in the image processing system in mode 7, the order control unit performs a control such as to transfer the structured document code having a single set of foreground and mask, in an order of the mask, the background, and then the foreground.

In mode 9, in the image processing system in mode 7 or 8, the order control part performs transferring of the code of mask of the structured document in block units, which correspond to division areas of the mask.

In mode 10, in the image processing system in mode 9, the code of the mask of the structured document has a divided plurality of tiles of JPEG2000 code, and the tiles correspond to the blocks.

In mode 11, in the image processing system in mode 9 or 10, the transferring part has a determining unit determining as to whether the block of mask of the structured document corresponds to a character block or a non-character block; and the order control part performs a control such that the transfer of character block is given priority over the transfer of non-character block.

In mode 12, in the image processing system in any one of modes 7 through 11, the image reproducing unit is included in a client apparatus; the transferring unit is included in a server apparatus connected with the client apparatus via a communication network; and the transferring unit transfers the structured document from the server apparatus to the client apparatus via the communication network.

In mode 13, a server apparatus includes a transferring unit transferring a structured document code, including background and at least one set of foreground and mask, to a client apparatus via a communication network, wherein the transferring unit has an order control unit controlling a transferring order of the structured document code, which performs a control to give priority to the code of the mask over the code of the foreground.

In mode 14, in the server apparatus in mode 13, the order control unit performs a control to transfer the structured document code having a single set of foreground and mask, in an order of the mask, the background and then the foreground.

In mode 15, in the server apparatus in mode 13 or 14, the transfer control unit transfers the code of mask of the structured document in block units which correspond to division areas of the mask.

In mode 16, in the server apparatus in mode 15, the code of mask of the structured document corresponds to a divided plurality of tiles of JPEG2000 code, and the tiles correspond to the blocks.

In mode 17, in the server apparatus in mode 15 or 16, the transferring unit has a determining unit determining as to whether the block of mask of the structured document corresponds to a character block or a non-character block; and the order control unit performs a control such that the transfer of character block is given priority over the transfer of non-character block.

In mode 18, a computer readable information recording medium storing a program including instructions to cause a computer as the transferring unit in any one of modes 7 through 17.

Ordinarily, in the mask of a structured document, character information that is most significant upon recognizing the contents of the document is included. On the other hand, in the foreground, character color information is included which has relatively low significance. In the background, a picture such as a photograph, which supplements the character information may be included, which is more significant than the character color information, generally speaking. According to one embodiment of the present invention, in the above-mentioned modes 1 through 12, the mask code of the structured document is transferred with higher priority that that of the background code. Especially, according to one embodiment of the present invention, in the modes 2 through 8, the code is transferred in the order of the mask, the background and then the foreground. Accordingly, in the transfer destination, the information having higher significance can be reproduced with higher priority, and thus, the contents of the document can be efficiently recognized.

When a page size of the document is large, a longer time may be required for a reproduction of the mask information in the transfer destination when the entire mask code is transferred in a lump. In embodiments, in the modes 3 through 5 and the modes 9 through 11, the mask code is transferred in block units. Accordingly, in the transfer destination, the mask information can be reproduced in sequence in block units. Since a time required for reproducing each block of the mask information is short, the document contents can be recognized earlier. Further, according to embodiments of the present invention, in the modes 4 and 10, the mask information is mask-divided JPEG2000 code. Accordingly, by extracting the tile parts from the mask code (JPEG2000 code stream) and transferring the same, the above-mentioned block-unit transferring can be easily achieved. Further, according to embodiments of the present invention, in the modes 5 and 11, the code of character blocks which are those including significant character information of the mask is transferred with higher priority than the code of non-character blocks; the character block information can be thus reproduced earlier in the transfer destination. Accordingly, in comparison to a case where the character blocks/non-character blocks are reproduced without distinguishing therebetween, the document contents can be recognized more efficiently.

In embodiments of the present invention in the modes 14 through 17, the transferring method in embodiments of the present invention of the modes 1 through 7 can be executed, and also, the image processing system in the server-and-client configuration according to embodiments of the present invention in the modes 8 through 11 can be achieved.

Further, in the modes 18 and 19, in embodiments of the present invention in the modes 1 through 6 can be easily achieved with the use of a computer, and also, the image processing system or the server apparatus according to embodiments of the present invention, in the modes 7 through 17 can be easily achieved with the use of a computer.

Figure 8:
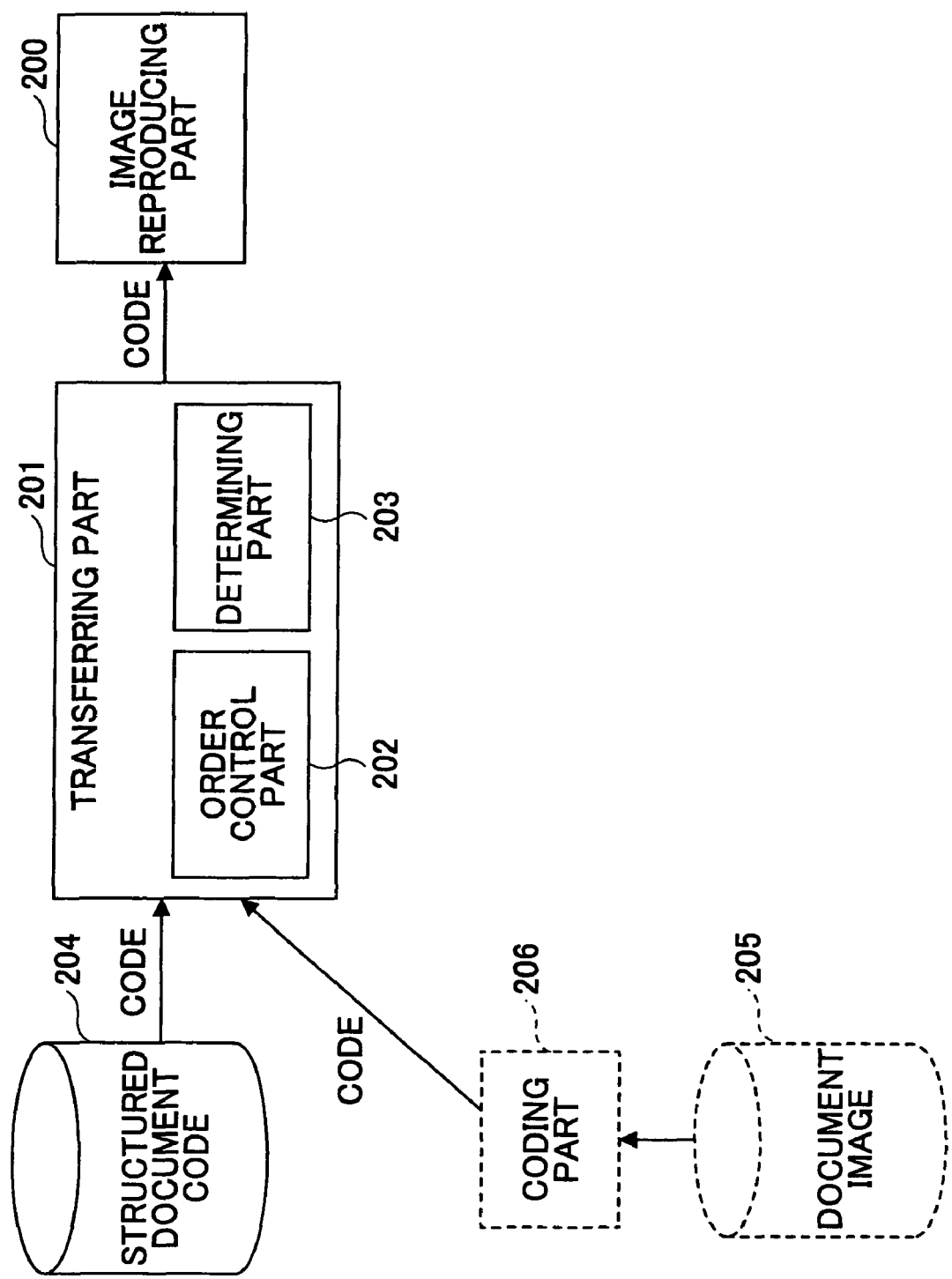
FIG. 8 shows a block diagram illustrating an image processing system according to the present invention.

FIG. 8 shows a block diagram illustrating a configuration of an image processing system according to one embodiment of the present invention. This image processing system includes an image reproducing unit 200 performing reproduction of a document image from a structured document code; and a transferring unit 201 transferring the structure document code to the image reproducing part 200 according to the transferring method of the present invention.

The transferring unit 201 takes the structured document code stored in a code storage unit 204, and transfers the same, in this example. However, it is also possible, according to one embodiment of the present invention, that the structured document code is generated from the document code stored in an image storage unit 205 by a coding unit 206, and then is transferred by the transferring unit 201.

An order control unit 202 is included in the transferring unit 201, and controls the transferring order of the structured document code. Further, in the above-mentioned modes 5 and 11, in order to distinguish between character blocks and non-character blocks, a determining unit 203 is also included in the transferring unit 201.

The above-described image processing system may have a configuration in a mode A in which both the image reproducing unit 200 and the transferring unit 201 are included in a single apparatus, or may have a configuration in a mode B in which these two units 200 and 201 are included in physically separate two apparatuses. The latter mode B typically corresponds to a system mode in a server-and-client configuration shown in FIG. 9. In this configuration, 300 denotes a client apparatus, 301 denotes a server apparatus, and both apparatuses 300 and 301 are connected via a communication network 302. The image reproducing unit 200 is included in the client apparatus 300 while the transferring unit 201 is included in the server apparatus 301, as shown. The transferring unit 201 transfers the structured document code via the communication network 302.

An image processing system in the above-mentioned mode A may be achieved by a program in a common computer including a CPU, a memory, a display device, a communication interface, an input device, a hard disk drive and so forth. That is, at least one program which includes instructions for causing the computer as the image reproducing unit 200 and the transferring unit 201 is stored, for example, in the hard disk drive. Then, when necessary, the program is loaded in the memory, is executed by the CPU, and thus the image processing system is built in the computer.

A computer readable information recording medium such as a magnetic disk, a magneto-optical disk, a semiconductor memory device or such storing such a program corresponds to the above-mentioned mode 18 of the present invention. The program thus includes a program causing the computer to act as the transferring unit 201.

Also, the client apparatus 300 and the server apparatus 301 in the mode B may be achieved by programs in common computers, respectively. The program achieving the server apparatus 300 includes a program stored in the computer readable information recording medium of the mode 18 of the present invention, which has instructions causing the computer to act as the transferring unit 201.

Figure 9:
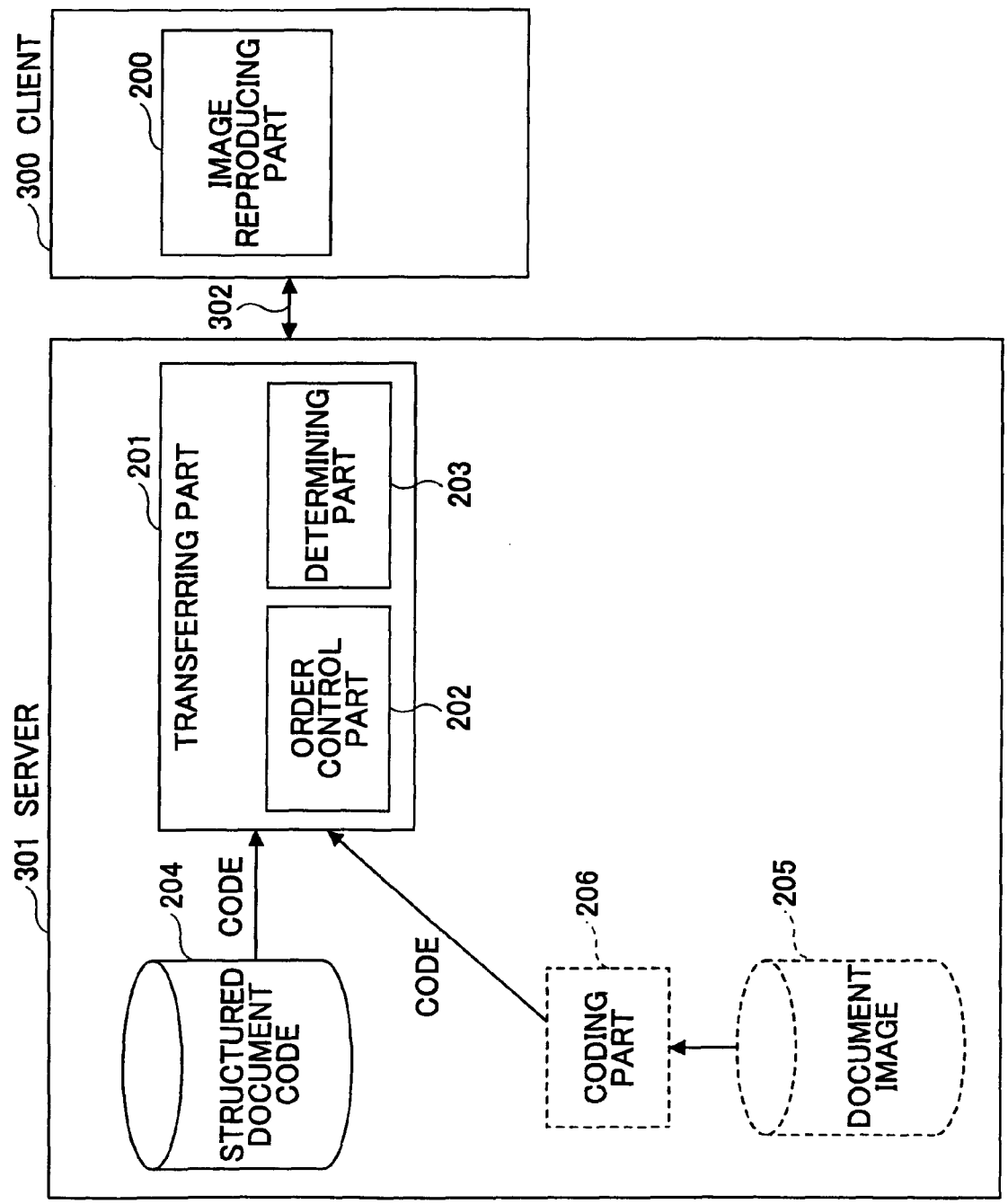
FIG. 9 shows a block diagram of an image processing system in a server-and-client configuration.

Below, the image processing system in the mode B shown in FIG. 9 is described. However, this is merely for the purpose of convenience of description. The description may also be applied to the image processing system in the mode A. Further the description below corresponds to an embodiment of the structured document code transferring method in the above-mentioned modes 1 through 6.

Embodiment 1

Figure 10:
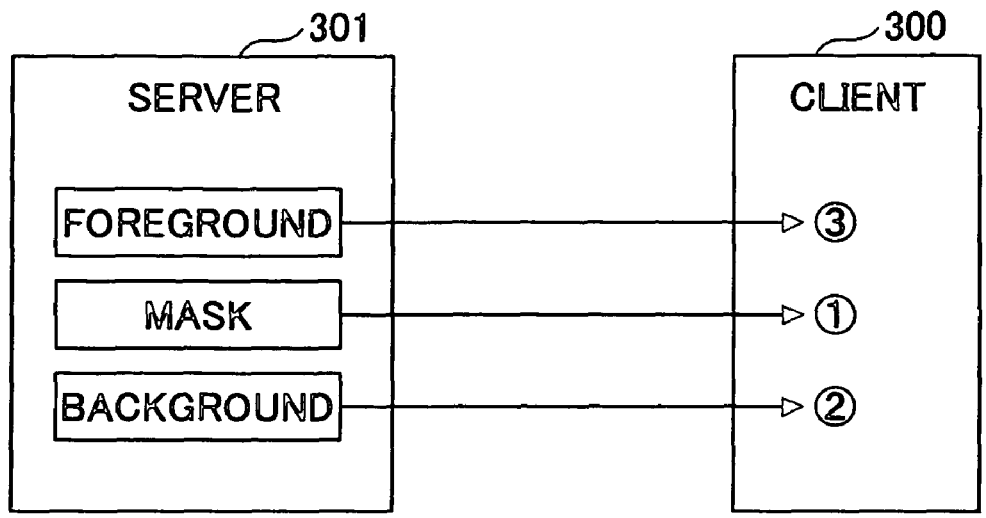
FIG. 10 illustrates code transferring according to an embodiment.
Figure 11:
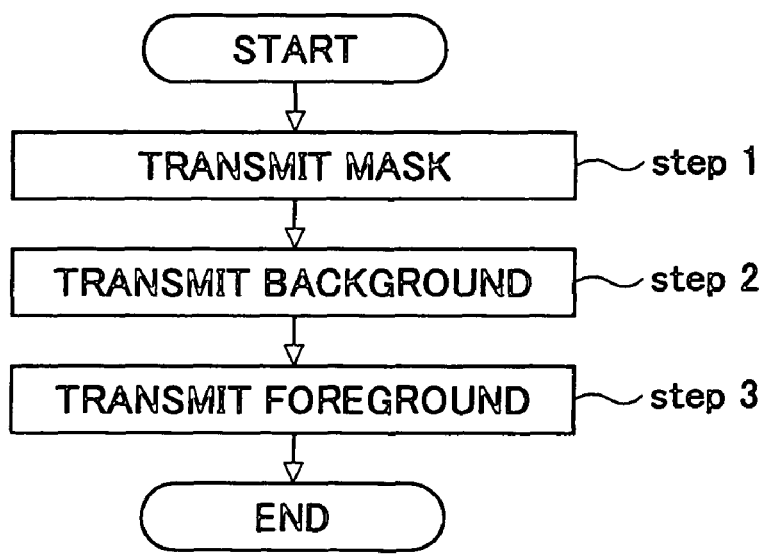
FIG. 11 shows how an image is seen at a client.

In the embodiment 1 of the present invention, the code processing unit 201 performs transferring the structured document code including 'background, mask and foreground' (i.e., including one set of 'foreground and mask'. A flow diagram of the transferring processing is shown in FIG. 11. Under the control of the order control unit 202, as shown in FIG. 10, the code of the mask is transferred first (step 1), then the code of the background is transferred (step 2), and finally, the code of the foreground is transferred (step 3).

Figure 12:
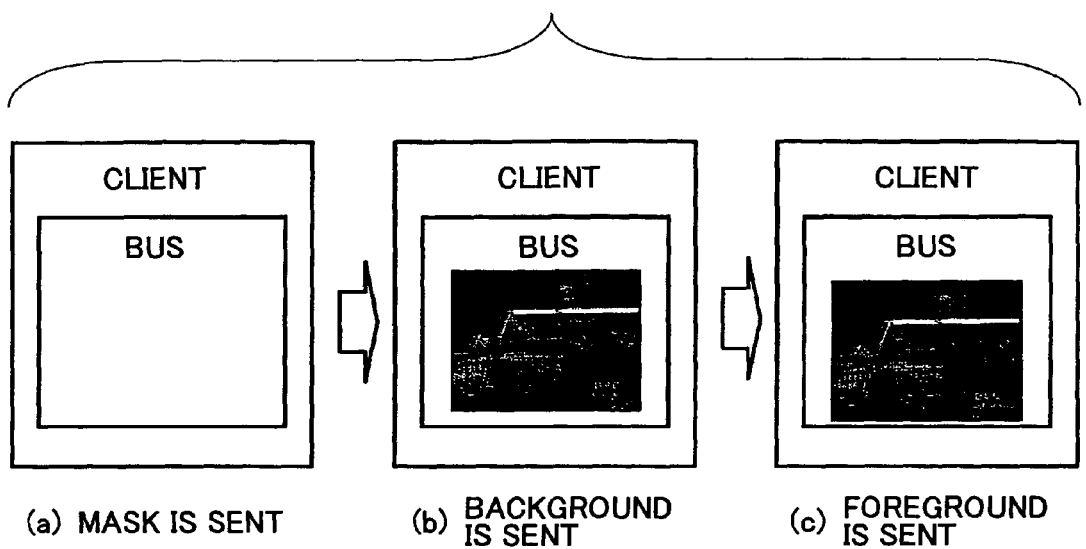
FIG. 12 shows a code transferring processing flow chart in two embodiments.

FIG. 12 shows one example of a state in which the image reproducing unit 200 of the client apparatus 300 reproduces an image. As shown in FIG. 12(a), first, the mask code is decoded and only the image thereof is displayed. In this example, the mask includes only character information of three characters, i.e., 'B', 'U' and 'S' ('BUS'), neither foreground nor background has been decoded at this stage, and thus, only the characters 'BUS' of a predetermined color are displayed on a white background. In this stage, a user who sees it can recognize that this document relates to a 'bus'. Subsequently, the code of the background is decoded, and as a result, the image is displayed in which the 'BUS' is overwritten on the background (a photograph image of a bus) (see FIG. 12(b)). At this stage, the user can recognize that the document has the contents of the photograph of the bus. Finally, the code of the foreground (specifying a color of the characters) is decoded. As a result, the characters 'BUS' are painted by the color specified by the foreground (see FIG. 12(c); it is noted that the actual color is not shown in the figure).

Thus, a control of code transferring order is made such that transfer of the code of the mask including the character information which is most significant for recognizing the contents of a document is given the highest priority, the code of the background which may frequently include a picture or such supplementing recognition of the characters is transferred next, and finally, the code of the foreground which has color specifying information, which has, generally speaking, the lowest significance, is transferred. As a result, on the client side, the user can easily recognize the contents of the document at the earlier stage of the document image reproduction processing. The example of FIG. 12 is an example of a combination of the photograph and the caption 'BUS' thereof. In a more common document including, as a large part, the contents described by characters, in many cases the user can recognize almost all the contents of the document when only the character description is first displayed. Accordingly, the above-mentioned transferring order control is remarkably advantageous.

Embodiment 2

In the embodiment 2 of the present invention, the same as in the embodiment 1 described above, the transferring unit 201 performs transferring of code of structured document including 'background, mask and foreground'. First, the code of mask is transferred, the code of background is transferred next, and finally the code of foreground is transferred, the same as in the embodiment 1. Accordingly, an overall flow of the structured document code transferring processing in this embodiment is as shown in FIG. 11.

However, in the step 1 of FIG. 11, the code of mask is transferred in block units. Further, for the blocks of mask, the determining unit 203 determines whether each block is a character block or a non-character block. Then, according to the determination result, the order control unit 202 makes a control of a mask code transferring order such that the character blocks are transferred earlier than the non-character blocks.

Figure 13:
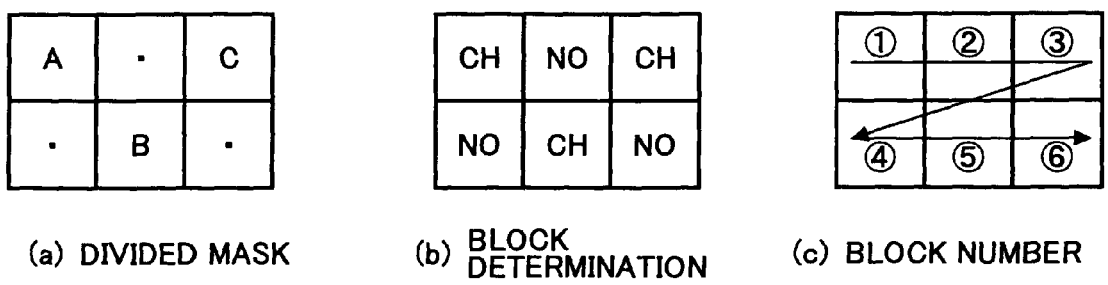
FIG. 13 illustrates an example of mask block dividing and a character/non-character block determination process.
Figure 14:
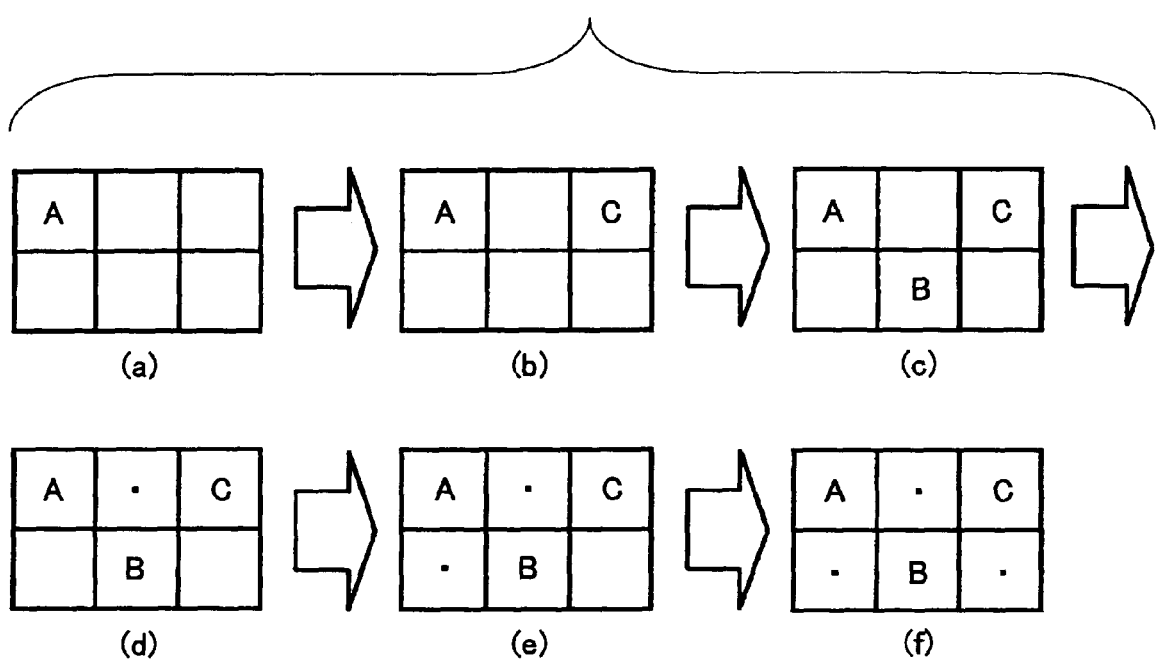
FIG. 14 shows an order of block-unit code transferring.

For example, it is assumed that, the mask is divided into six blocks as shown in FIG. 13(*a*), and the blocks filled by 'CH' in FIG. 13(*b*), are determined as the character blocks while those filled by 'NO' are determined as the non-character blocks. Further, it is assumed that the blocks are previously given the numbers according to the raster order as shown in FIG. 13(*c*). The blocks of mask determined as the character blocks are first transferred in block units in the ascending order of the above-mentioned rater numbers. After that, the blocks of mask determined as the non-character blocks are transferred in block units in the ascending order of the above-mentioned rater numbers. Accordingly, the images of the characters of mask are first displayed on the client side in sequence as FIG. 14(*a*), (*b*) and then (*c*). Thus, the contents of the characters can be recognized earlier on the client side. In comparison to a case where the code of the entire mask is transferred in a lump, a transferring time and a decoding time can be effectively reduced when only the code of the character blocks is transferred first separately. Accordingly, the document contents can be recognized at an earlier stage. After the character block images are thus displayed, the non-character block images are then displayed in sequence as FIG. 14(*d*), (*e*) and then (*f*).

In a variant embodiment of the present embodiment 2, without distinguishing the mask blocks into the character blocks or the non character blocks, the mask code is transferred in block units, for example, according to the raster order. In this configuration, on the client side, the mask image can be displayed in sequence in block units. Accordingly, in comparison to the case where the mask code is transferred in a lump and the mask image is displayed after the entire mask code is transferred and decoded, the document contents can be recognized earlier since decoding and displaying can be performed each time when each block is transferred and decoded.

Figure 15:
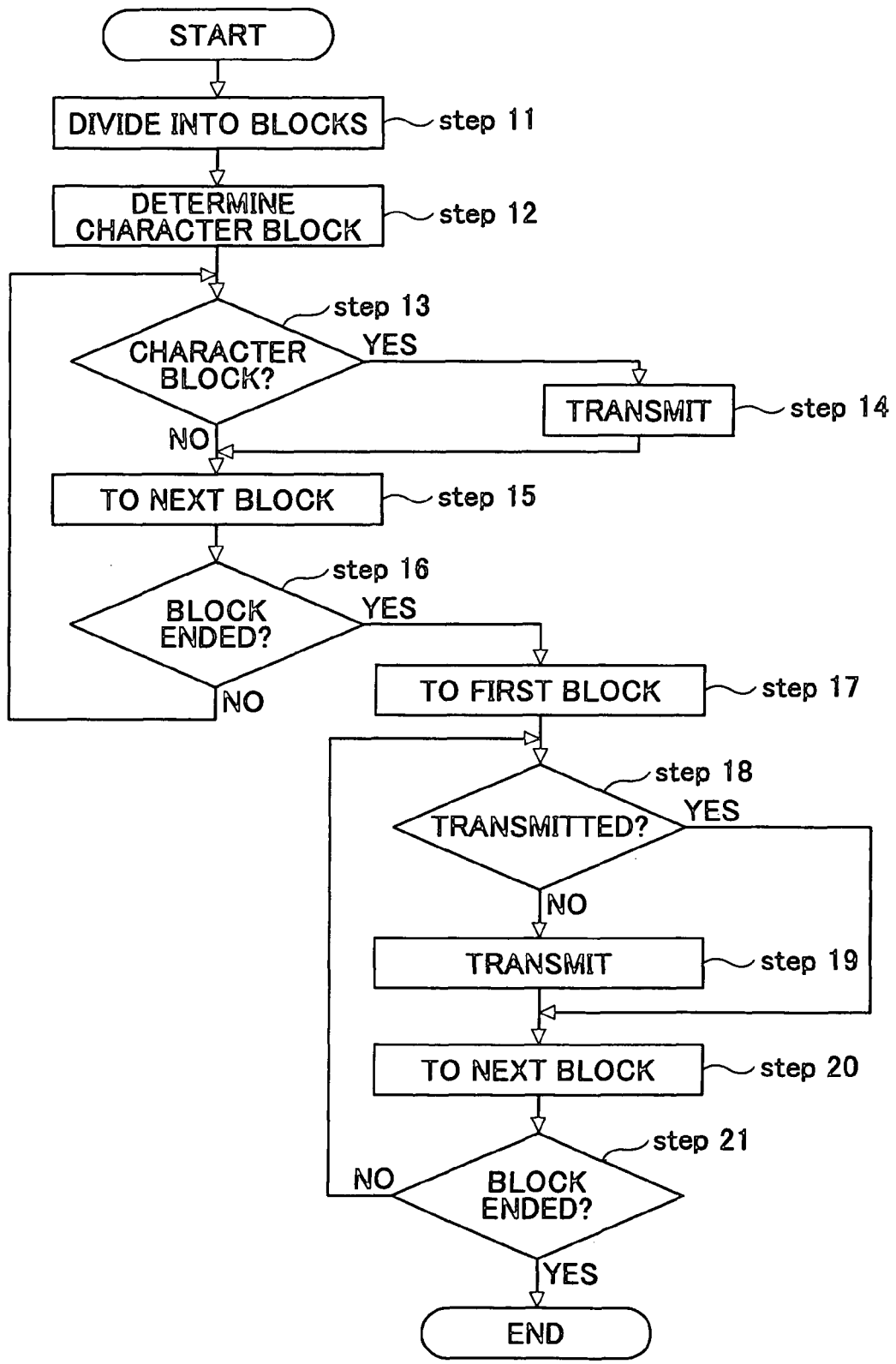
FIG. 15 shows mask-code transferring processing flow chart in other embodiments.

FIG. 15 shows a flow chart of the step 1 of FIG. 11 in the embodiment 2. There, the mask code corresponds to the JPEG2000 code in which tile dividing is made. The tiles are regarded as the blocks, and the character blocks of the mask code are transferred with higher priority than the non-character blocks in block units.

First, in the transferring part 201, the mask code (JPEG2000 code stream) is divided into tile parts (step 11). These tile parts correspond to the blocks. It is noted that the headers of the tile parts include information of the tile numbers (i.e., the block numbers).

Then, the determining unit 203 determines, for each block (i.e., each tile), whether it corresponds to a character block or a non-character block (step 12). There is commonly relationship that, in image information, characters have large edge amounts, and also, as the edge amount included in the block becomes larger, the code amount of the block increases. From this relationship, a method can be taken for the character/non-character-block determination in which, the code amount of each block (tile part) is compared with a predetermined threshold, and, the block having the code amount not less than the threshold is determined as the character block, while the block having the code amount less than the threshold is determined as the non-character block. However, the present invention is not limited to this method.

After the determination, the transferring unit 201 performs transferring the mask code in block units. At this time, the order control unit 202 makes a transfer order control such that transferring of the character block code is given higher priority than that of the non-character block code.

That is, the order control unit 202 determines, for the block having the smallest number, whether or not it corresponds to a character block (step 13). When it does not correspond to a character block, a next block is taken (step 15), while, when the same corresponds to a character block, the order control part 202 causes the transferring unit 201 to transfer the block (step 14), and then takes a next block (step 15). In the same manner, the order control unit 202 makes a control to cause each character blocks to be transferred. Thus, the order control unit 202 makes a control such as to transfer the character blocks in the ascending order. Then, when the last block is processed (yes of step 16), step 17 is performed. In step 17, the order control unit 202 selects the block having the smallest number, and, when the block has been already transferred (yes of step 18), a next block is taken (step 20). When the selected block has not been transferred yet (no of step 18), the block is made to be transferred (step 19). Then, a next block is taken (step 20). Thus, the order control unit 202 makes a control such as to transfer the non-character blocks in the ascending order. Then, when the final block has been processed (Yes in step 21), the transferring processing is finished.

When, in order that the client side which has received the code blocks that were transferred can decode the same in block units and arrange the corresponding images of the decoded blocks on a page, the main header information of the mask code (JPEG2000 code stream) should also be transferred to the client side, commonly. For this purpose, for example, the main header may be attached to the character block code (tile parts) of the mask first transferred. However, it is also possible that the main header is separately transferred previously, or any other method may be taken.

Further, in the embodiment 2, JPEG2000 is applied as the mark coding method. However, any other coding method may be applied instead as long as coding/decoding can be made in block units. Further, upon transferring, when the structured document code is generated from a document image, it is also possible that, the mask is first divided into blocks before being coded, and then, the respective blocks are coded separately. This can be said also for an embodiment 4 described later.

Embodiment 3

In the embodiment 3 of the present invention, transferring of the code of the structured document including 'background 0; and n sets of foregrounds k and masks k) (where k=0, 1, ..., n-1) is performed. For each set of foreground and mask, the order control unit 202 makes a transfer order control to transfer the mask code with higher priority than the foreground code. Further, among background 0, mask 0 and foreground 0, a transfer order control is made such that the code is transferred in the order of mask 0, background 0 and then foreground 0, as shown in FIG. 16.

Figure 16:
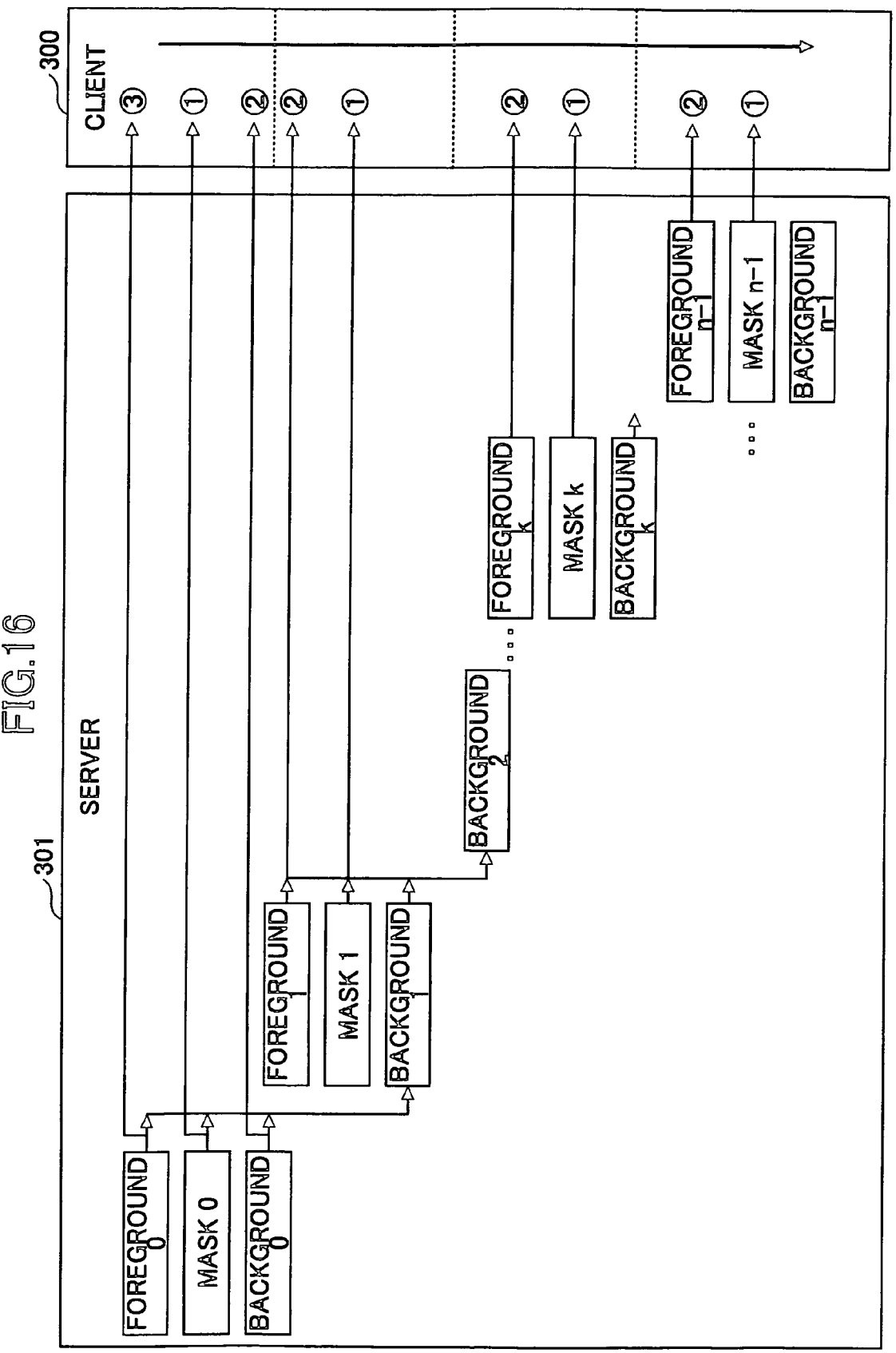
FIG. 16 illustrates code transferring in the embodiments.

FIG. 16 shows the structured document code transferring order and a manner of image production on the client side in the embodiment 3, diagrammatically. The server side 301 transfers, to the client side 300, the code in the order of mask 0, background 0, foreground 0, mask 1, foreground 1, ..., mask n-1 and then foreground n-1. The client side 300, receiving them same, produces background 1 from the combination of background 0, mask 0 and foreground 0; produces background 2 from the combination of thus-produced background 1, mask 1 and foreground 1; ..., and, through the repetition of the processing, finally, the client side 300 produces background n from the combination of background n-1, mask n-1 and foreground n-1. The background n that is produced corresponds to a final reproduced document image. In each step of k=0, 1, 2, ..., n-1, the mask code is transferred with higher priority. Also, the produced image from the combination in each step is displayed, in sequence. Accordingly, in each step, the character information, which is significant information of the document, is displayed with higher priority. Thus, the contents of the document can be easily recognized earlier on the client side 300.

Figure 17:
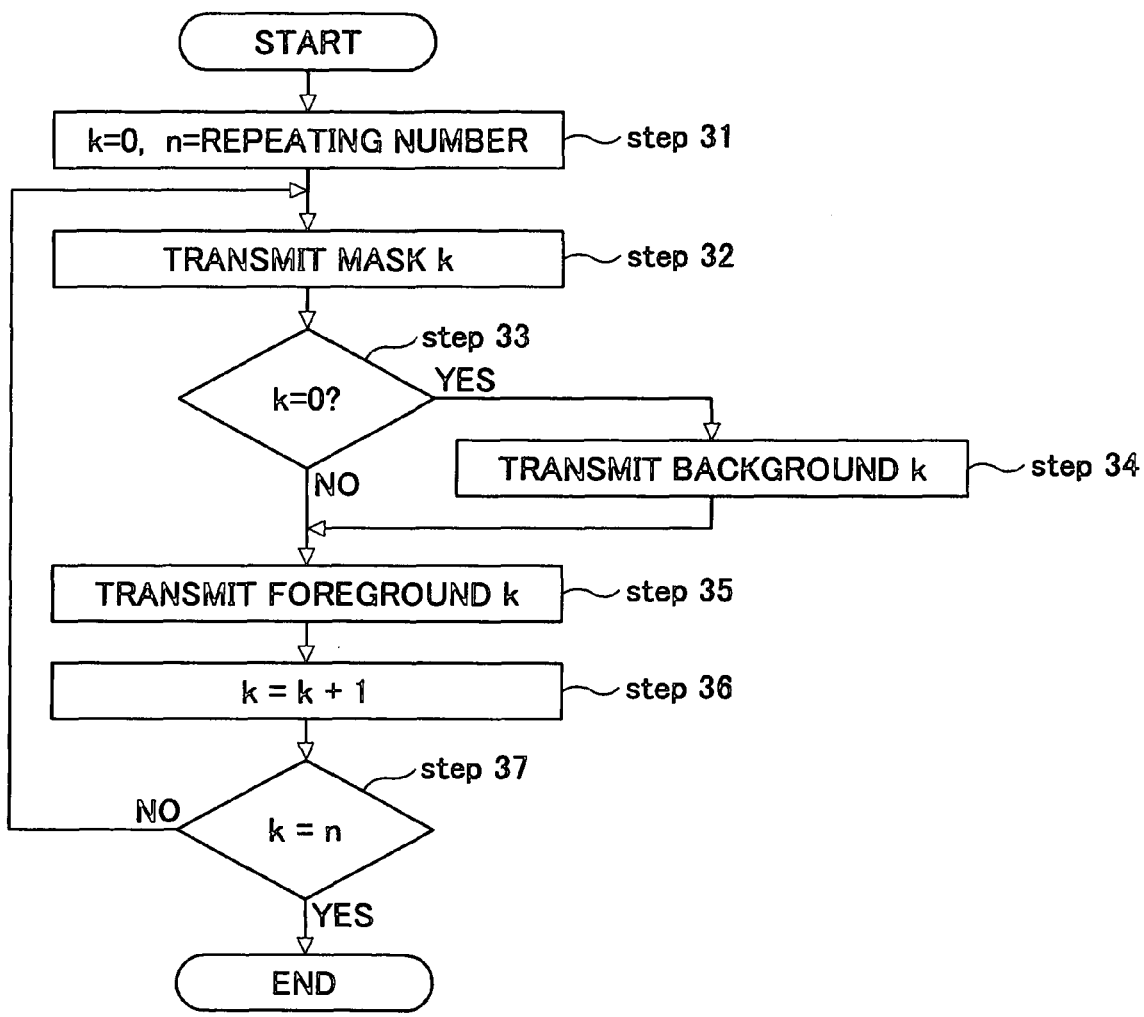
FIG. 17 shows a code transferring processing flow chart in an embodiment.

FIG. 17 shows a flow chart of the processing of the transferring unit 201 in the embodiment 3. First, the order control unit 202 sets 0 in 'k', and sets a repeating number of times (i.e., the total number of sets of masks and backgrounds) in 'n' (step 31). Then, the order control part 202 takes a mask k, and causes the transferring unit 201 to transfer the same to the client side (step 32). Then, when k=0 (Yes in step 33), background k is taken, and the code thereof is made to be transferred to the client side by the transferring unit 201 (step 34). On the other hand, when k≠0 (No in step 33), foreground k is taken and is made to be transferred to the client side (step 35). Next, k is incremented by 1 (step 36), mask k is taken, and is made to be transferred (step 32). This process of code transfer in steps 32 through 36 is repeated until k=n (Yes in step 37). Thus, the above-described processing is performed.

Embodiment 4

In the embodiment 4 of the present invention, the structured document code transferring processing is performed according to the flow diagram shown in FIG. 17. However, in step 32, the same as in the embodiment 2, the mask code is transferred in block units in such a manner that character blocks of the mask are transferred with higher priority than non-character blocks. Such a processing flow of step 32 may be the same as that of FIG. 15 described above, and the duplicated description is omitted. However, instead, without distinguishing character/non-character blocks, the mask code may be transferred in the raster order in block units.

Further, the present invention is not limited to the above-described embodiments, and variations and modifications may be made without departing from the basic concept of the present invention claimed below.

What is claimed is:

1. A method of transferring code of a structured document comprising background and at least one set of foreground and mask, to an image reproducing unit which reproduces a document image from the structured document code, comprising:

for each set of foreground and mask, performing a control by a computer, to give priority to a code of the mask over a code of the foreground;

performing the control to transfer the structured document code having a single set of the foreground and the mask, in an order of the mask, the background, and then the foreground;

transferring the code of the mask of the structured document in block units that correspond to division areas of the mask, wherein a determination is made, for each block unit of the mask of the structured document, as to whether the block unit of the mask of the structured document comprises a character block unit or a non-character block unit, and, based on the determination result, a control is performed such that the transfer of the character block unit is given priority over the transfer of the non-character block unit.

2. An image processing system comprising:

a computer including:

an image reproducing unit to reproduce a document image from code of a structured document comprising background and at least one set of foreground and mask; and a transferring unit to transfer the structured document code to the image reproducing unit wherein:

the transferring unit comprises an order control unit to control a transferring order of the structured document code, wherein the transferring unit comprises a determining unit to determine, for each block unit of the mask of the structured document, whether the block unit of the mask of the structured document comprises a character block unit or a non-character block unit;

the order control unit performs a control to give priority to a code of the mask over a code of the foreground; and the order control unit performs the control to transfer the structured document code having a single set of the foreground and the mask, in an order of the mask, the background and then the foreground, wherein the order control unit performs transferring the code of mask of the structured document in block units that correspond to division areas of the mask and the order control unit performs a control such that the transfer of the character block unit is given priority over the transfer of the non-character block unit.

3. The image processing system as claimed in claim 2, wherein:

the code of mask of the structured document comprises a divided plurality of tiles of JPEG2000 code, and the tiles comprise the block units.

4. The image processing system as claimed in claim 2, wherein:

the image reproducing unit is included in a client apparatus;

the transferring unit is included in a server apparatus connected with the client apparatus via a communication network; and the transferring unit transfers the structured document from the server apparatus to the client apparatus via the communication network.

5. The image processing system of claim 2, wherein m objects are used in sequence and a blending operation for the background and the foreground is repeated m times.

6. A non-transitory computer readable information recording medium storing a program comprising instructions to cause a computer to operate as the transferring unit claimed in claim 2.

* * * * *